(12) United States Patent
Crews

(10) Patent No.: US 7,959,071 B1
(45) Date of Patent: Jun. 14, 2011

(54) BANKING SYSTEM OPERATED RESPONSIVE TO DATA BEARING RECORDS

(75) Inventor: Tim Crews, Alliance, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 12/283,749

(22) Filed: Sep. 15, 2008

Related U.S. Application Data

(60) Provisional application No. 60/994,104, filed on Sep. 17, 2007.

(51) Int. Cl.
   *G06F 17/00* (2006.01)
   *G06K 5/00* (2006.01)
   *G06Q 40/00* (2006.01)

(52) U.S. Cl. ........ 235/379; 235/375; 235/380; 235/382; 235/382.5; 705/43; 902/8; 902/22; 902/30; 902/38

(58) Field of Classification Search .......... 235/379, 235/375, 380, 382, 382.5; 705/43; 902/1–42
See application file for complete search history.

(56) References Cited

U.S. PATENT DOCUMENTS

| | | | | |
|---|---|---|---|---|
| 6,055,047 A * | 4/2000 | Schweizer et al. | ......... | 356/237.1 |
| 6,135,440 A * | 10/2000 | Lynch et al. | ......... | 271/34 |
| 7,432,818 B2 * | 10/2008 | Ray | ......... | 340/635 |
| 7,677,447 B2 * | 3/2010 | MacPhail et al. | ......... | 235/380 |
| 2005/0275152 A1 * | 12/2005 | Baum et al. | ......... | 271/121 |

* cited by examiner

*Primary Examiner* — Michael G Lee
*Assistant Examiner* — Laura Gudorf
(74) *Attorney, Agent, or Firm* — Ralph E. Jocke; Daniel D. Wasil; Walker & Jocke

(57) ABSTRACT

An automated banking machine operates responsive to data read from data bearing records. The machine includes a sheet dispensing mechanism including at least one currency note picking member. Rotation of a picking member causes an end note to be picked from a stack of currency notes. The picking member includes an outer surface portion that has a thickness including a built in physical wear indicator. The indicator includes material surface layers of different colors. Each color indicates a different surface wear state.

20 Claims, 17 Drawing Sheets

BANKING SYSTEM OPERATED RESPONSIVE TO DATA BEARING RECORDS

CROSS REFERENCE TO RELATED APPLICATION

This Application claims benefit pursuant to 35 U.S.C. §119 (e) of Provisional Application Ser. No. 60/994,104 filed Sep. 17, 2007 the disclosure of which is incorporated herein by reference.

TECHNICAL FIELD

This invention relates to automated banking machines that operate responsive to data read from user cards and which may be classified in U.S. Class 235, Subclass 379.

BACKGROUND ART

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine which enables customers to carry out banking transactions. Banking transactions carried out may include the dispensing of cash, the making of deposits, the transfer of funds between account and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an ATM shall be deemed to include any machine that may be used to electronically carry out transactions involving transfers of value.

Automated banking machines may benefit from improvements.

OBJECTS OF EXEMPLARY EMBODIMENTS

It is an object of an exemplary embodiment to provide an automated banking machine that operates responsive to data read from data bearing records.

It is an object of an exemplary embodiment to provide an automated banking machine that includes wear level indicators for components.

It is a further object of an exemplary embodiment to provide an automated banking machine that includes an indicator that denotes a particular component wear condition by a particular color.

It is a further object of an exemplary embodiment to provide an automated banking machine that includes a currency note picking device that includes a wear level indicator.

It is a further object of an exemplary embodiment to provide an automated banking machine that includes a currency note transporter belt that includes a wear level indicator.

It is a further object of an exemplary embodiment to provide an automated banking machine which enables a currency dispenser device to be more accurately inspected and serviced.

It is a further object of an exemplary embodiment to provide a method of servicing an automated banking machine.

It is a further object of an exemplary embodiment to provide a method of servicing a currency dispenser of an automated banking machine that reduces the time and cost of servicing.

Further objects of exemplary embodiments will be made apparent in the following Detailed Description of Exemplary Embodiments and the appended claims.

The foregoing objects are accomplished in an exemplary embodiment which involves an automated banking machine that operates in response to data bearing records and that includes a currency dispenser. An exemplary dispenser has a currency cassette, a note picker device, a note transporter, and a note presenter. The picker device includes at least one picker roller. A band of high friction resilient material extends around the circumference of the roller. The band includes a circumferential segment comprising multi layers of overlapping different colors. Each color layer signifies a different thickness level of the segment. Each color layer signifies a different wear state for the band. The exposing of a predetermined color indicates that the segment is worn out and that the band should be replaced.

DETAILED DESCRIPTION OF EXEMPLARY EMBODIMENTS

Figure 1:
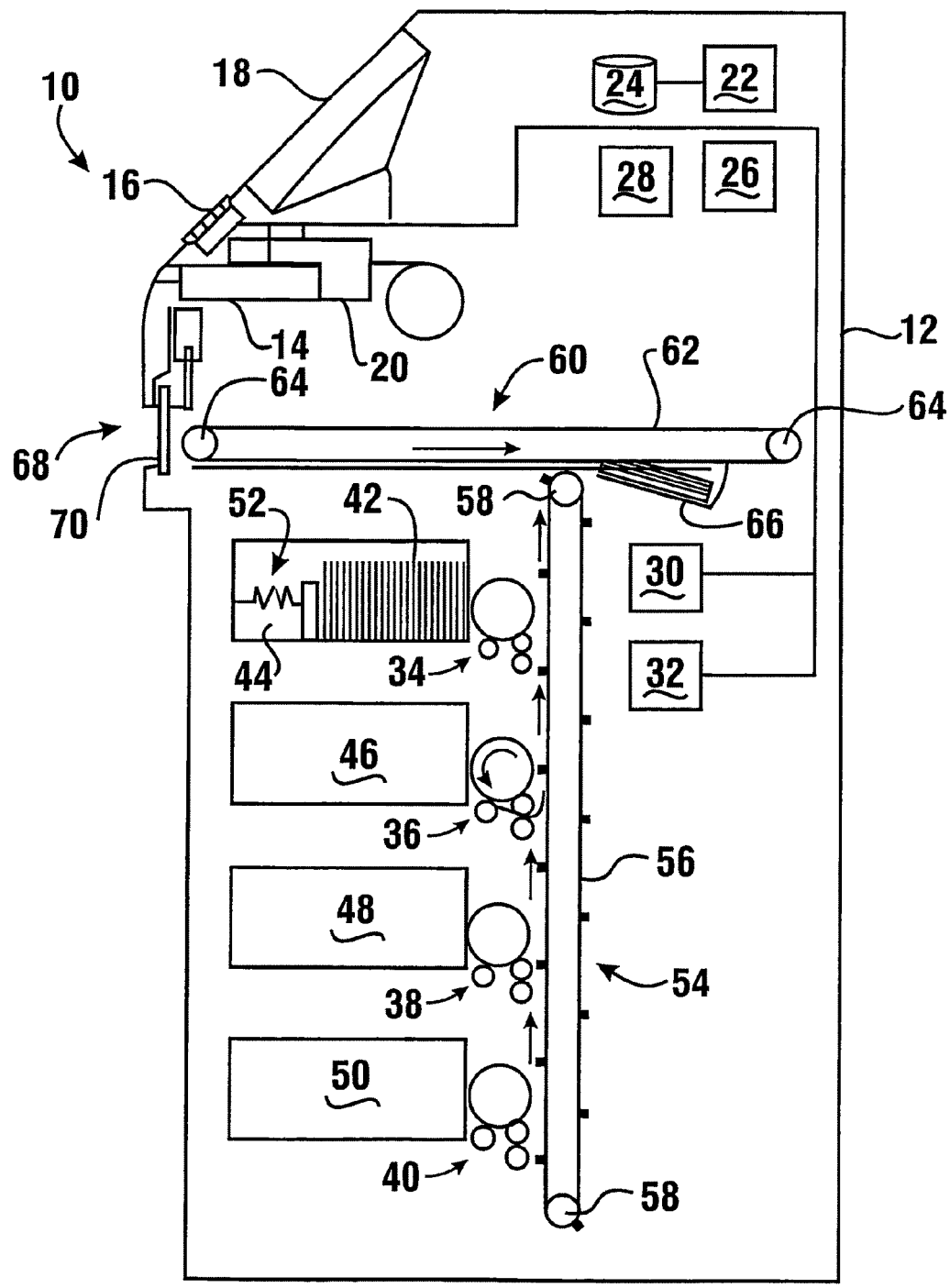
FIG. 1 is a side schematic view of an automated banking machine of a first exemplary embodiment.

Referring now to the drawings and particularly FIG. 1, there is shown therein an exemplary embodiment of an automated banking machine generally indicated 10. In the exemplary embodiment machine 10 is an ATM. However it should be understood that the invention may be used in connection with other types of automated transaction machines and banking machines.

Automated banking machine 10 includes a housing 12 which houses certain components of the machine. The automated banking machine 10 includes a customer interface portion (e.g., fascia). The interface portion can include input devices and output devices.

In an exemplary embodiment the input devices include a card reader schematically indicated 14. Card reader 14 is operative to read a customer's card which includes information about the customer thereon, such as the customer's account number. In some embodiments the card reader 14 may be a card reader adapted for reading magnetic stripe cards, contactless cards and/or so-called "smart cards" which include a programmable memory.

Another input device in the exemplary embodiment are input keys 16. Input keys 16 may be arranged in a keypad or keyboard. Input keys 16 may alternatively or in addition include function keys or other types of devices for receiving manual inputs.

It should be understood that in various embodiments other types of input devices may be used such as biometric readers, speech or voice recognition devices, inductance type readers, IR type readers, and other devices capable of communicating with a person, article or computing device, radio frequency type readers and other types of devices which are capable of receiving information that identifies a customer and/or their account. A biometric reader device may be operative to receive customer identifying inputs such as fingerprints, iris scans, retina scans, face topography data, voice data, DNA scans, or other inputs that provide data that is usable to identify an authorized machine user. An example of an ATM that uses biometric input devices and other types of input devices is shown in U.S. Pat. No. 6,023,688, the disclosure of which is fully incorporated herein by reference. Plural input devices, such as a card reader device and a biometric reader device, can also be used in overlapping conjunction in a process of verifying whether a customer is authorized to use the machine.

The exemplary embodiment of machine 10 also includes output devices providing outputs to the customer. In the exemplary embodiment machine 10 includes a display 18. Display 18 may include an LCD, CRT or other type display that is capable of providing visible indicia to a customer. In other embodiments output devices may include devices such as audio speakers, RF-transmitters, IR transmitters or other types of devices that are capable of providing outputs which may be perceived by a user either directly or through use of a computing device, article or machine. It should be understood that some embodiments may also include combined input and output devices such as a touch screen display which is capable of providing outputs to a user as well as receiving inputs.

The exemplary embodiment of the automated banking machine 10 also includes a receipt printer schematically indicated 20. The receipt printer is operative to print paper receipts for users reflecting transactions conducted at the machine. Embodiments may also include other types of printing mechanisms such as statement printer mechanisms, ticket printing mechanisms, check printing mechanisms and other devices that operate to apply indicia to media in the course of performing transactions carried out with the machine.

Automated banking machine 10 further includes one or more controllers schematically indicated 22. Controller 22 includes one or more processors that are in operative connection with one or more data stores or memory schematically indicated 24. The controller is operative to carry out programmed instructions to achieve operation of the machine in accomplishing transactions. As schematically indicated, the controller is in operative connection with a plurality of the transaction function devices included in the machine.

The exemplary embodiment includes at least one communications device 26. The communications device may be one or more of a plurality of types of devices that enable the machine to communicate with other systems and devices for purposes of carrying out transactions. For example communications device 26 may include a modem for communicating messages over a data line or wireless network, with one or more other computers that operate to transfer data representative of the transfer of funds in response to transactions conducted at the machine. Alternatively the communications device 26 may include various types of network interfaces, line drivers or other devices suitable to enable communication between the machine 10 and other computers and systems. In exemplary embodiments the automated banking machine may operate using the features described in U.S. Pat. Nos. 7,404,515 and/or 7,405,724 the disclosures of which are incorporated herein in their entirety.

Machine 10 also includes a plurality of sensing devices for sensing various conditions in the machine. These various sensing devices are represented schematically by component 28 for simplicity and to facilitate understanding. It should be understood that a plurality of sensing devices are provided in the machine for sensing and indicating to the controller 22 the status of devices within the machine.

Automated banking machine 10 further includes a plurality of actuators schematically indicated 30 and 32. The actuators may comprise a plurality of devices such as motors, solenoids, cylinders, rotary actuators and other types of devices that are operated responsive to the controller 22. It should be understood that numerous components within the automated banking machine are operated by actuators positioned in operative connection therewith. Actuators 30 and 32 are shown to schematically represent such actuators in the machine and to facilitate understanding.

In the exemplary automated banking machine 10 there are four sheet dispenser mechanisms 34, 36, 38 and 40. Each sheet dispensing mechanism is operative responsive to the controller 22 to pick sheets. Sheets may be selectively picked generally one at a time from a stack of sheets such as stack 42 shown adjacent to sheet dispenser mechanism 34. In the exemplary embodiment each of the stacks of sheets associated with a respective sheet dispenser mechanism is housed in a canister (or cassette). A canister 44 houses sheets in connection with dispenser mechanism 34. Likewise, a canister 46 houses sheets to be picked by dispenser mechanism 36. A further canister 48 houses sheets dispensed by dispenser mechanism 38 and another further canister 50 houses sheets that are dispensed by dispenser mechanism 40. As schematically represented in canister 44, the stack of sheets 42 is biased to engage the sheet dispenser mechanism by a biasing mechanism 52.

One or more cassettes (or canisters) can be removably mounted in a dispenser frame or module. Dispenser modules may be secured together in a stacked arrangement as shown in U.S. patent application Ser. No. 10/797,441 filed Mar. 9, 2004, the disclosure of which is fully incorporated herein by reference.

In the exemplary embodiment, canisters 44, 46, 48 and 50 are used to house sheets having predetermined value such as bank notes. Such bank notes may be of various denominations which enable dispensing money in varying amounts to customers. Alternatively one or more of the canisters may hold other types of sheets such as coupons, scrip, tickets, money orders or other items of value. The controller operates the dispenser mechanism selectively in response to customer inputs and information from systems with which the machine communicates, to cause sheets to be selectively dispensed from the canisters.

Notes that are dispensed from the canisters in the exemplary embodiment are engaged with a first note transport schematically indicated 54. First note transport 54 which is later described in detail, includes a plurality of continuous belts 56. The belts extend around sets of rollers 58 which operate to drive and guide the belts. As shown schematically in FIG. 1 by the sheet dispensed from dispenser mechanism 36, sheets are enabled to engage the adjacent flights of belts 56 and move in engagement therewith upward to a second transport 60.

The second transport 60 in the exemplary embodiment may be similar to that shown in U.S. Pat. No. 5,342,165 the disclosure of which is incorporated by reference as if fully rewritten herein. Transport 60 also includes a plurality of continuous belts 62 which extend about sets of rollers 64. Rollers 64 operate to drive the belt 62 such that notes passing upward in transport 54 initially engage flights of belt 62 and are collected into a stack 66. In response to operation of the controller 22 when a desired number of notes have been collected in the stack 66, the stack is moved in the manner of the incorporated disclosure and the belts 62 are driven so that the stack 66 is moved toward a user opening 68 in the housing 12 of the machine. As the notes are moved toward the opening 68, the controller operates a suitable actuating device to operate a gate 70 so as to enable the stack to pass outward through the opening. As a result the user is enabled to receive the sheets from the machine. After a user is sensed as having removed the stack from the opening, the controller may operate to close the gate 70 so as to minimize the risk of tampering with the machine.

It should be understood that the devices shown in connection with exemplary automated banking machine 10 are representative of devices that may be found in such machines. Numerous additional or alternative types of devices such as deposit accepting devices, document reading devices, currency accepting devices, ticket printing devices and additional devices may be included in automated banking machines which are used in connection with alternative embodiments.

It should also be understood that the type and locations of particular inlets and outlets of the fascia shown herein is exemplary, and that other arrangements and configurations may be used. That is, the described ATM user interfaces are exemplary and in other exemplary embodiments the user interface may include different components and/or features and/or arrangements. For example, a different arrangement may have the locations of the receipt outlet slot and the mini statement outlet switched. Likewise, a card slot and a receipt outlet slot may be switched. An envelope storage holder may also be added thereto or substituted for therein in other arrangements.

Other exemplary embodiments of automated banking machines may have a different type of customer interface portion. For example, other exemplary embodiments may not include a customer fascia on or adjacent to a chest portion. Such alternative machines may be operated as document delivery devices only. Such exemplary embodiments may be used to deliver sheets or documents to a cashier, bank teller, or other service provider. Such alternative exemplary embodiments may also include a remotely positioned operator interface which can selectively cause documents to be delivered from a disposed machine.

Figure 14:
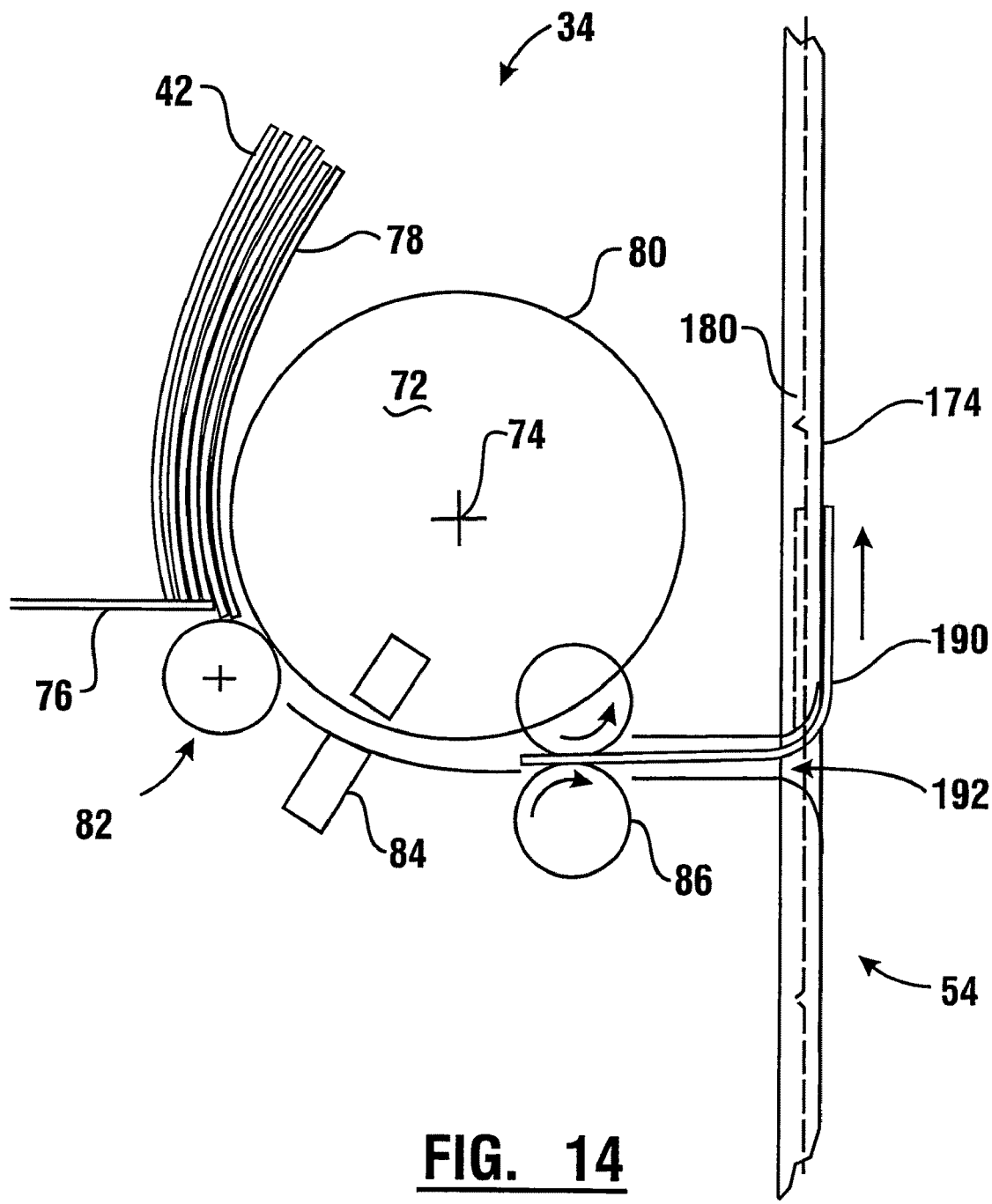
FIG. 14 is a side schematic view showing a sheet that has been dispensed by a dispenser mechanism moving to engage a sheet transport.

FIG. 14 shows a first sheet dispenser mechanism 34 in greater detail. In the exemplary embodiment of the machine 10 all the dispenser mechanisms may be the same, or different types of sheet dispenser mechanisms may be used. Dispenser mechanism 34 includes a picking member 72. The picking member 72 is selectively rotated responsive to the controller 22 about an axis 74. Bank notes or other sheets in the stack 42 are supported by a supporting surface 76 which terminates in the area adjacent to the picking member. An end note 78 bounds the stack adjacent to the picking member 72. During each rotation of the picking member the then current end note bounding the stack is moved and delivered from the stack and passed to the transport 54.

The picking member 72 has an outer bounding surface 80. The outer bounding surface 80 is in generally abutting relation with stripping members 82 which are alternatively referred to herein as stripper members or strippers. As previously discussed the stripping members 82 in the exemplary embodiment do not rotate in a clockwise direction as shown in FIG. 14. In the exemplary embodiment, the stripping members 82 will however rotate in a counterclockwise direction due to action of associated one-way clutches as later described.

Positioned downstream of the stripping members 82 is a doubles detector 84. Doubles detector 84 may be a mechanical sensor, radiation sensor, sonic sensor or other type sensor that is suitable for determining if single or multiple notes have moved past the stripping member toward the transport. Downstream of the doubles detector are a pair of carry away rolls 86. The carry away rolls are operative to engage sheets that have moved sufficiently away from the stack so as to engage the rolls. The rolls which are operated by a drive in response to the controller 22, operate to engage sheets and move them into the transport. It should be understood that this configuration of the dispenser mechanism is exemplary and in other embodiments different configurations may be used.

As discussed in the incorporated disclosure of U.S. Pat. No. 5,577,720, the normal operation of the dispenser mechanism involves the picking member rotating responsive to the controller 22 during picking operations. When it is desired to pick the end note 78, the picking member 72 rotates in a counter-clockwise direction as shown in FIG. 14 about the axis 74. This is done through operation of a drive or other similar device. Rotation of the picking member urges the end note 78 to move from the stack. The stripping members 82 resist the movement of the end note because the stripping members do not move in a clockwise direction as shown in FIG. 14. Because of the surface area of the picking member 72 engaging the end note and the frictional properties of the outer bounding surface 80, the force urging the end note 78 to move from the stack generally overcomes the resistance force of the stripping members. This is because the stripping members have a smaller surface area and/or a different frictional coefficient resulting in less resistance force than the moving force of the picking member. The stripping members however provide sufficient resistance to resist generally all but the end note 78 from moving from the stack. This is because the notes in the stack other than the end note, are not directly engaged with the picking member and do not experience the same degree of force urging them to move from the stack.

As the end note 78 is moved from the stack the thickness thereof may be sensed by the doubles detector 84. The doubles detector 84 is operatively connected to the controller and at least one signal from the doubles detector provides an indication as to whether a single or a multiple note has been pulled from the stack. In circumstances where multiple notes are sensed, the controller may cause the picking member to operate to stop rotating in the counterclockwise direction as shown in FIG. 14, and instead to rotate in a clockwise direction. When the picking member 72 rotates in a clockwise direction to pull sheets back into the stack 42, the exemplary stripping members 82 are enabled to cooperatively rotate in a counterclockwise direction as shown in FIG. 14. This is due to the one-way clutch associated with each of the stripping members. As a result the sheets are returned to the stack. Thereafter the controller 22 may again operate so as to rotate picking member 72 in a counterclockwise direction and an attempt is again made to pick a single end note from the stack.

In circumstances where the doubles detector 84 senses only a single note passing from the stack, the controller operates a drive or other suitable moving mechanism to cause the carry away rolls 86 to engage and move the sheet to the transport 54. It should be understood that the steps described as being taken responsive to operation of the controller are exemplary. In some embodiments the controller may cause the machine to operate to direct double notes to a divert bin or other storage area rather than attempting to repeatedly pick a single note.

Figure 2:
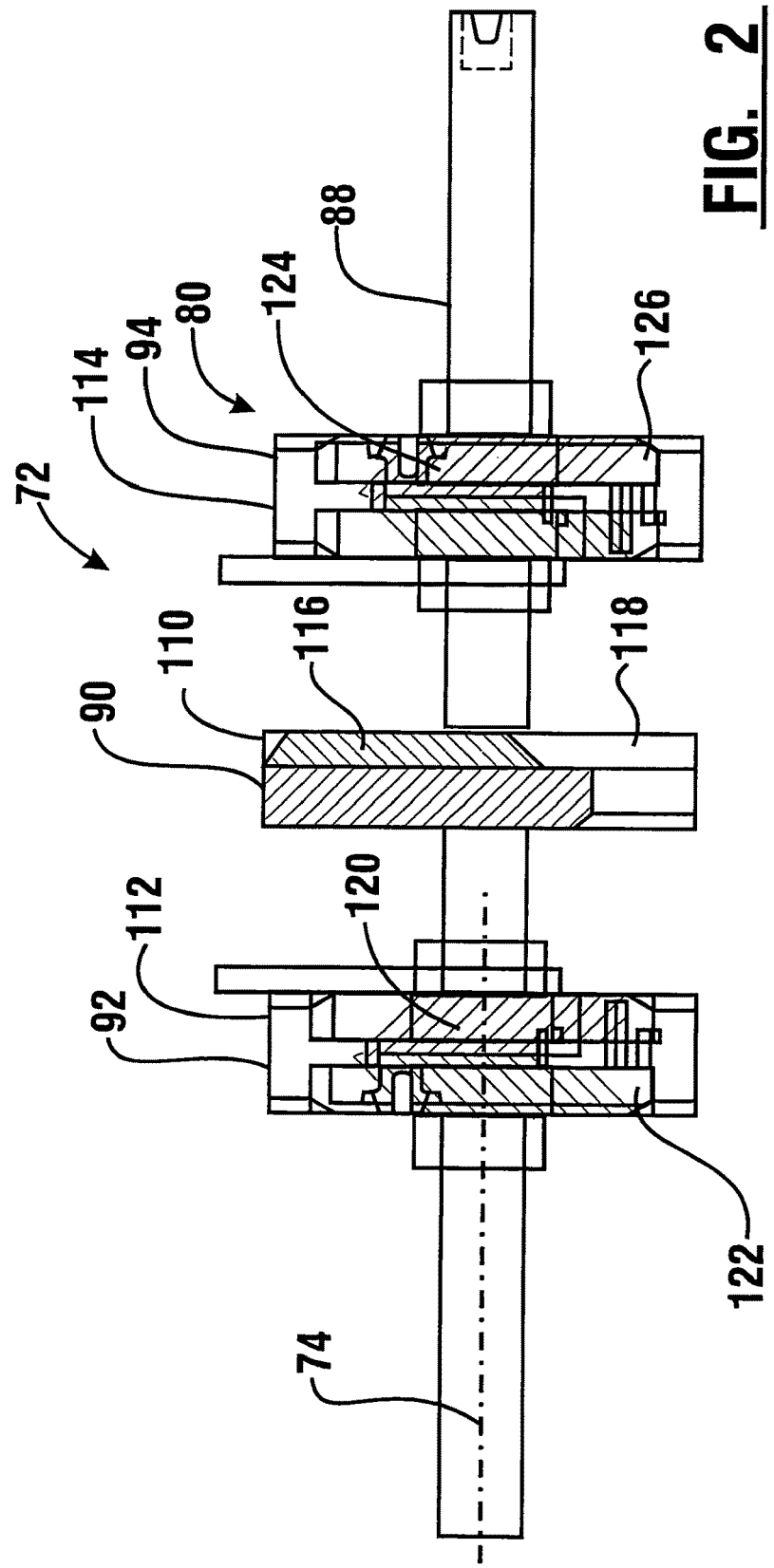
FIG. 2 is a side view of a picking member used in the first exemplary embodiment.
Figure 3:
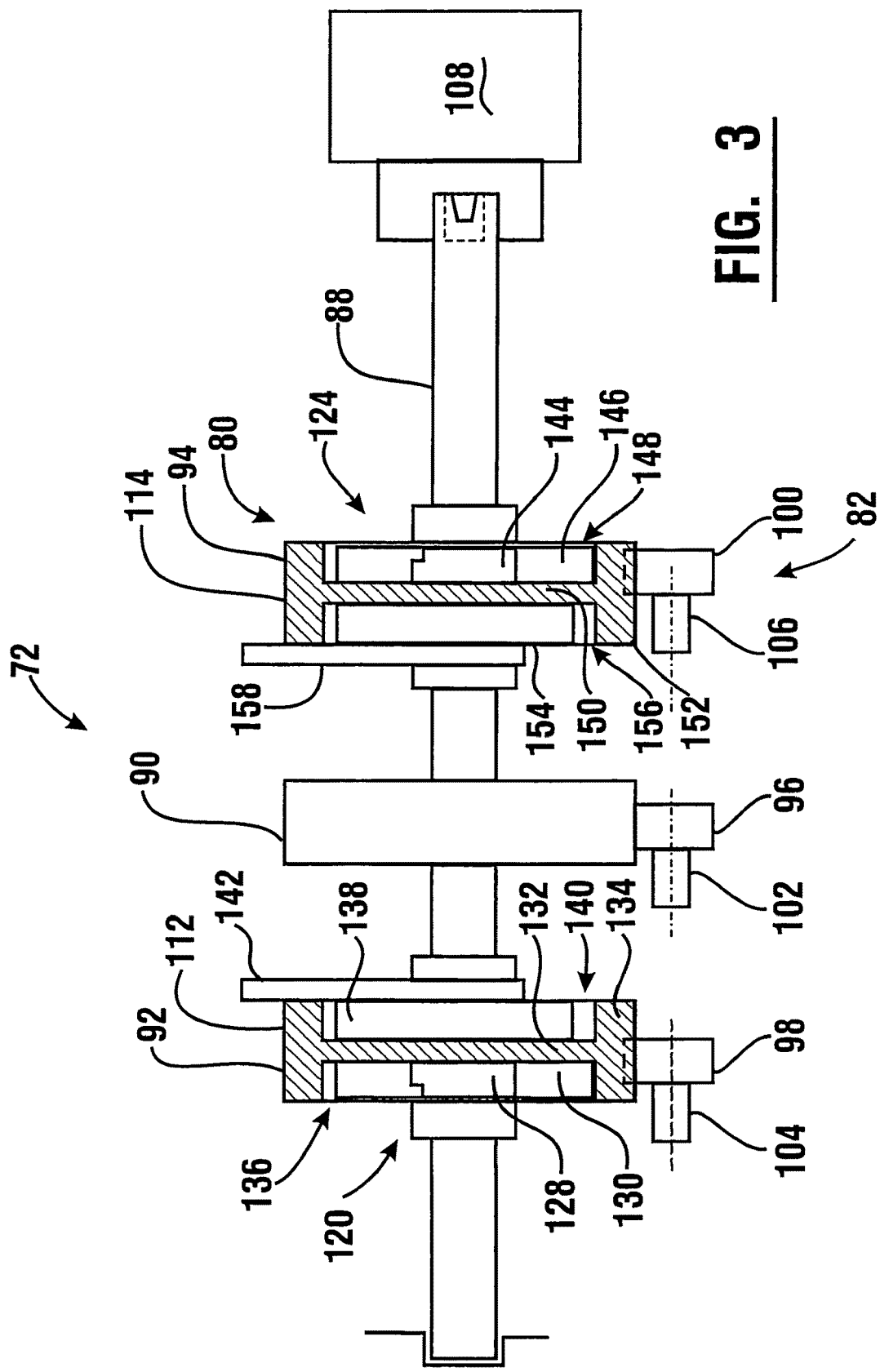
FIG. 3 is a cross sectional view of the picking member shown in FIG. 2 in operative connection with a drive in the machine.

The picking member of the first exemplary embodiment is shown in greater detail in FIGS. 2 and 3. The picking member 72 includes a central shaft 88. Three separated cylindrical portions are supported on the shaft. These cylindrical portions include a central portion 90. Disposed on a first axial side of cylindrical portion 90 is a first outboard portion 92. Disposed in an opposed axial direction from the central cylindrical portion is a second outboard portion 94.

As shown in FIG. 3 each cylindrical portion 90, 92 and 94 has an associated one of the stripping members 82 in abutting relation therewith, indicated 96, 98 and 100 respectively. Each of the stripping members has an associated one-way clutch 102, 104 and 106 operatively connected therewith. Each of the one-way clutches as previously discussed, enables only one-way rotation of the stripping member. The stripping member is enabled to rotate only when sheets are being pulled back into the stack. However when sheets are being picked the stripping members remain generally stationary.

As shown schematically in FIG. 3, shaft 88 is operatively connected with a drive 108 which selectively rotates the shaft responsive to signals from the controller. As also shown in FIG. 3, in the exemplary embodiment stripping member 96 which is in abutting relation with the central portion 90 is somewhat angularly disposed from stripping members 98 and 100 which are in abutting relation with the outboard portions 92 and 94 respectively. In the exemplary form stripping member 96 is disposed somewhat angularly forward of the other stripping members such that notes tend to engage the central stripping member during picking prior to engaging stripping members 98 and 100. Of course in other embodiments other approaches, configurations and types of stripping members and picking members may be used. Further as later discussed in connection with an alternative embodiment, not all cylindrical portions may operate in conjunction with opposed stripping members.

As shown in FIG. 2 the outer bounding surface 80 of the picking member includes an outer surface 110 of cylindrical portion 90, as well as outer surface 112 of cylindrical portion 92 and outer surface 114 of cylindrical portion 94. Outer surface 110 includes thereon a ribbed relatively high friction portion 116. The balance of the outer surface 110 has a relatively lower friction portion 118. High friction portion 116 applies an engaging force to the end note bounding the stack which is generally sufficient to engage and move the end note from the stack. The low friction portion 118 is generally enabled to move relative to the end note without causing the note to be moved from the stack. In the exemplary embodiment this construction facilitates reliably picking a single note each time the picking member is rotated one turn. This construction further provides spacing between notes sequentially picked from the stack. Such spacing facilitates identifying and handling of notes.

Outer surface 112 of cylindrical portion 92 likewise includes a ribbed, relatively high friction portion 120 on the outer surface thereof. Outer surface 112 also includes a relatively lower friction portion 122 which surrounds the high friction portion. The angular position of high friction portion 120 generally corresponds to high friction portion 116 on the central portion 90. As is the case with the other relatively high and low friction portions, high friction portion 120 applies force to the end note generally sufficient to engage and move it from the stack, while the relatively lower friction portion is enabled to move in engagement with the end note without causing it to be disposed from the stack. Similarly as shown in FIG. 2 cylindrical portion 94 also includes a generally high friction portion 124 and a generally lower friction portion 126. The high and low friction portions on the cylindrical portion 94 angularly correspond to the high and low friction portions on the other cylindrical portions of the picking member.

As most clearly shown in the partial cross sectional view in FIG. 3, within the high friction portion 120 of cylindrical portion 92, is an arcuate segment 128. Arcuate segment 128 occupies a portion of the axial width of the cylindrical portion toward the outboard side of the picking member. The arcuate segment 128 is supported on a movable member 130. Movable member 130 as later discussed in detail, is movable relative to the cylindrical portion and the picking member in a manner which enables arcuate segment 128 to move radially outward relative to the bounding surface bounding the picking member. In the exemplary embodiment the cylindrical portion 92 is generally I-shaped in transverse cross section and includes a central web portion 132. The web portion 132 terminates in cross section in a flange portion 134 which supports the outer surface 112 thereon. The movable member 130 is movable in a recess 136 on a first longitudinal side of the web member 132.

A cam 138 is positioned in a recess 140 which extends on opposed longitudinal side from recess 136. Cam 138 is in supporting connection with the shaft 88. Cam 138 is also in supporting connection with a support member portion 142. The support member portion 142 operates to hold the cam 138 stationary as the shaft 88 and cylindrical portion 92 rotates.

Cylindrical portion 94 includes structures which are generally a mirror image of those associated with cylindrical portion 92. The high friction portion of outer surface 114 includes an arcuate segment 144 which is supported on a movable member 146. The movable member 146 is positioned in a recess 148 which is bounded by a web portion 150 and a flange portion 152 of cylindrical portion 94.

A cam 154 is positioned in a recess 156 on an opposed longitudinal side from recess 148. Cam 154 is in supporting connection with the shaft 88 and is held stationary relative to the shaft by a support member portion 158.

Figure 4:
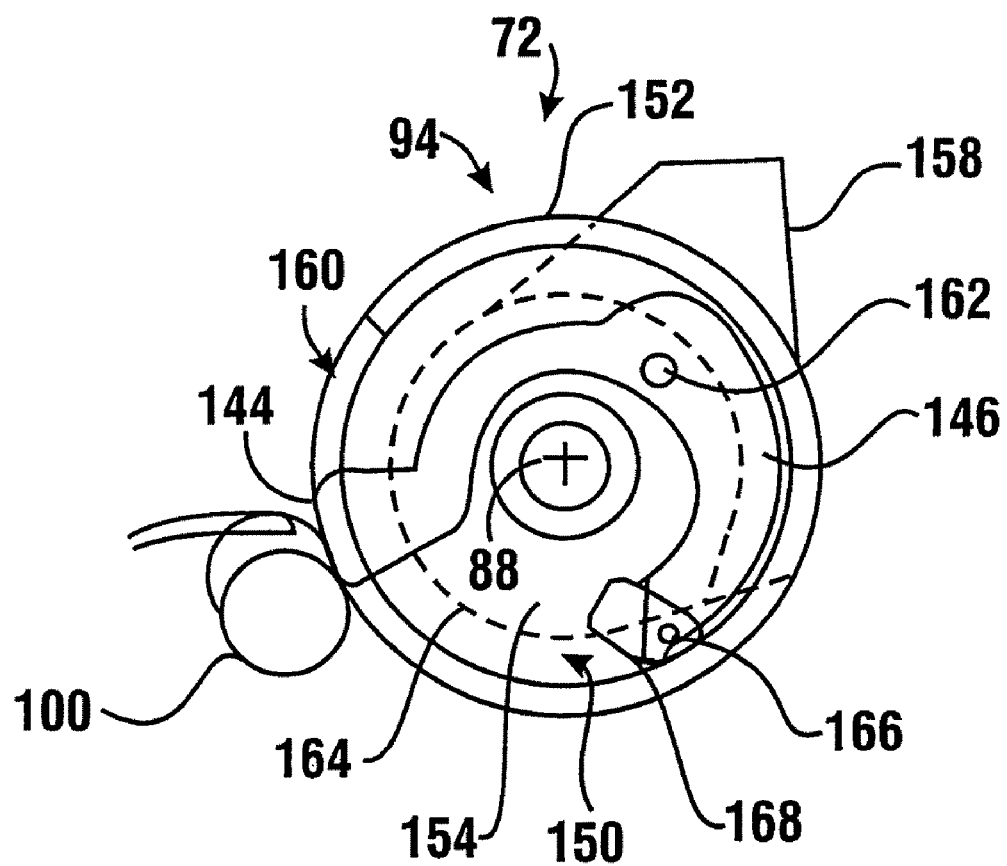
FIG. 4 is a side view of the picking member shown in FIG. 3.

As the operation of the cylindrical portions 92 and 94 of the picking member are similar, an explanation of the operation of the picking member will be described with reference to cylindrical portion 94. As best seen in FIG. 4, the segment 144 extends through an opening 160 in the flange portion 152 of cylindrical portion 94. The exemplary movable member 146 is generally horseshoe shaped and is supported on the picking member through a pivot connection 162. The pivot connection supports the movable member 146 through the web portion 150.

The cam 154 is bounded by a cam surface 164. A cam follower portion 166 is supported on the movable member 146 at an end opposed of the arcuate segment 144. The cam follower portion extends through an opening 168 in the web portion 150. This enables the cam follower portion 166 to engage the cam surface 164 of the cam 154. As can be appreciated, this arrangement enables the position of the arcuate segment 144 to be controlled as the picking member rotates due to the engagement of the cam follower 166 with the cam surface 164.

Figure 5:
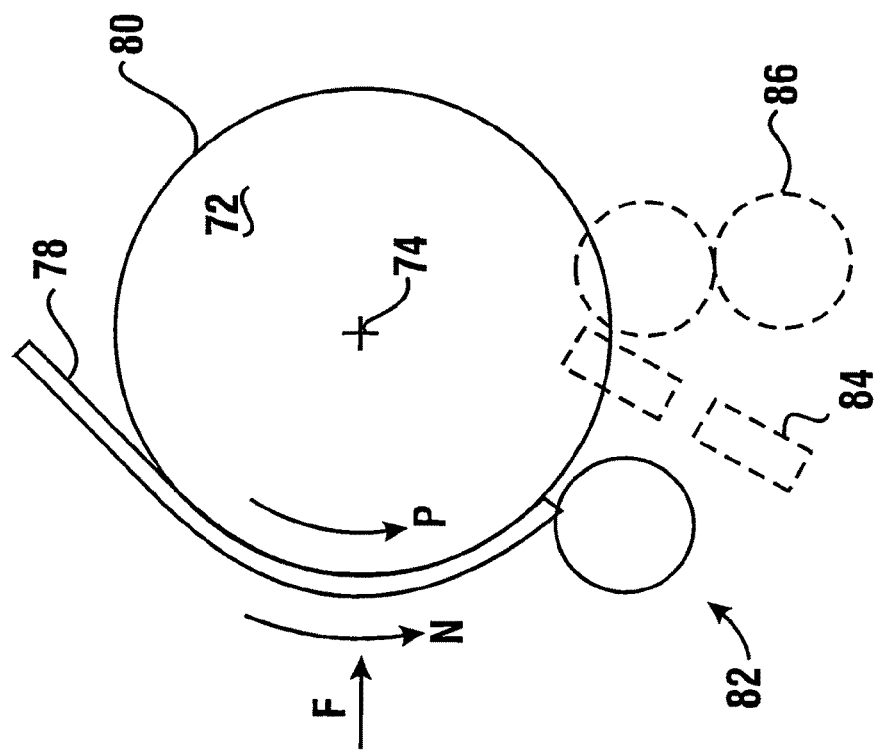
FIG. 5 is a side schematic view of the picking member operating to move an end note from the stack in circumstances where the end note moves in coordinated relation with the picking member.

The overall operation of the exemplary picking member 72 is explained with reference to FIGS. 5 and 6. As indicated in FIG. 5, during normal operation of the picking member the high friction portions on the picking members engage an end note 78 bounding the stack. The high friction portions move the note generally engaged and at the same speed as the picking member, past the stripping member 82 so that the end note is moved from the stack. During this normal operation the note moves in synchronized relation with the movement of the outer bounding surface 80 of the picking member 82. As a result during normal operation the velocity of the end note indicated by arrow N corresponds generally to the velocity of the outer surface 80 of the picking member represented by arrow P. Arrow F corresponds to the direction of the force applied to the stack which holds the end note 78 in engaged relation with the picking member 72.

Figure 6:
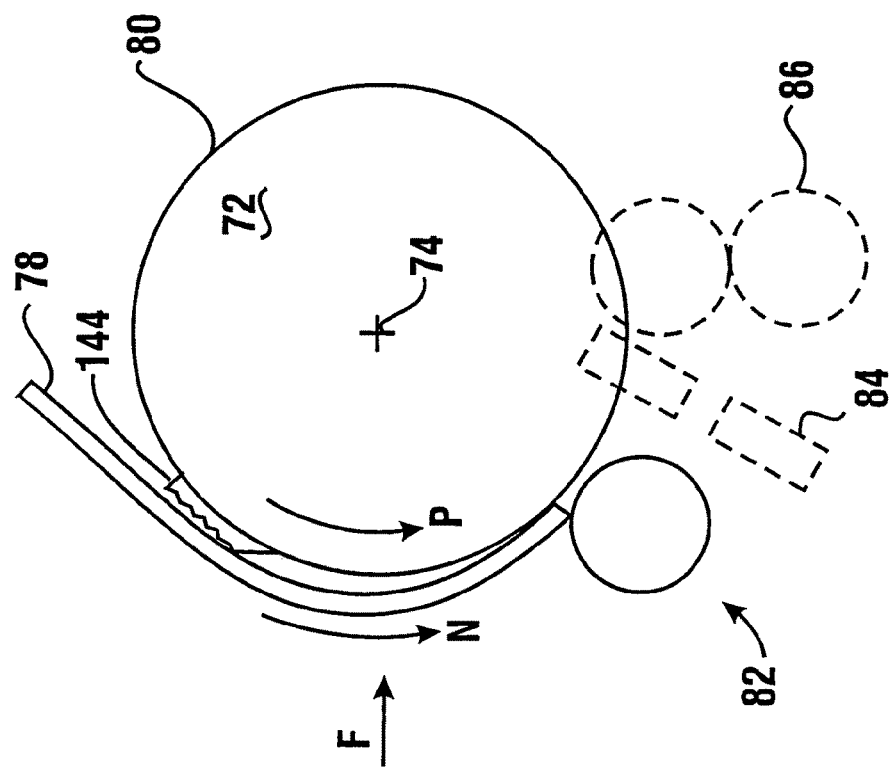
FIG. 6 is a view similar to FIG. 5 but showing the movement of the engaging portion of the picking member radially outward responsive to the picking member moving in a picking direction without corresponding movement of the end note.

FIG. 6 represents the operation of the picking member 72 of the first exemplary embodiment when an end note 78 fails to move in coordinated relation with the picking member. In such circumstances the velocity and displacement of the picking member is greater than the corresponding velocity and movement of the end note 78. The high friction arcuate segments 128, 144 which serve as engaging portions, because they are enabled to move relative to the picking member 72, tend to maintain engaged relation with the end note. This is represented by the arcuate segment 144 in FIG. 6. Because the engaging portion of the arcuate segment 144 remains engaged with the end note and is movable relative to the picking member, when the angular movement of the picking member exceeds the movement of the engaging portion of segment 144, the segment 144 moves radially outward relative to outer bounding surface 80. The movement of the engaging portion further radially outward relative to the axis of rotation 174 increases the engaging force on the end note urging it to move from the stack. As can be appreciated from the later detailed description of the movable member, the engaging portions tend to move further radially outward providing increasing engaging force, with an increase in difference between the movement of the picking member and the engaging portion. This increasing force on the end note tends to cause the end note to begin moving past the stripping members 82 so that the note can be picked. As the end note begins to move in coordinated relation with the picking member, the engaging portions may begin to move radially inward. In the exemplary embodiment the action of the cam follower portion and the cam surface operate to assure that the engaging portions are moved radially inward to the level of the outer bounding surface 80 by the time the engaging portions rotate to a position adjacent to the stripping members 82. This assures that the engaging portions and the notes are not damaged.

Figure 7:
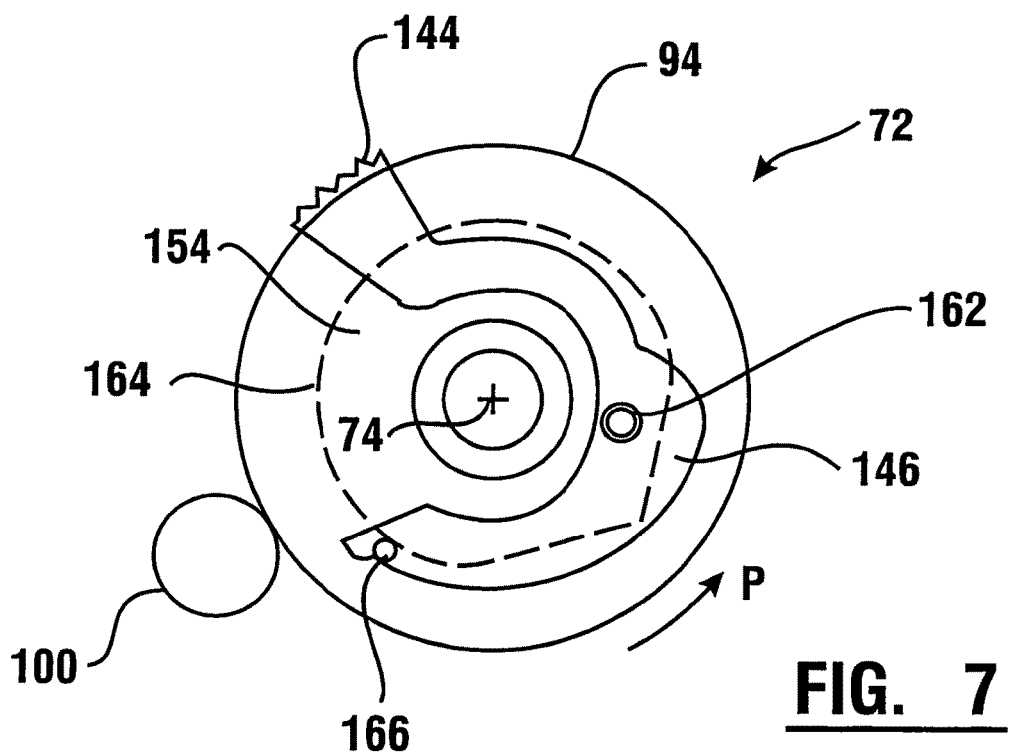
FIGS. 7-10 are side schematic views showing a sequence of positions of the engaging portion of the picking member and the operation of the cam surface to retract the engaging member as the picking member rotates.

FIGS. 7-10 show the exemplary operation of the picking member 72 with regard to cylindrical portion 94 of the picking member. It should be understood that cylindrical portion 92 is a mirror image thereof and works in a similar manner during picking. As represented in FIG. 7, the picking member 72 rotates in the direction of arrow P. Assuming that an end note engaged with the engaging portion which is included on segment 144 is not moving in synchronization with the picking member, the segment 144 rotates in a first direction about pivot connection 162. This results because the segment 144 is engaged with the note and the angular movement thereof does not correspond to the angular movement of the picking member 72 about the axis 74. Segment 144 moves radially outward relative to axis 74. The radially outward movement of segment 144 is limited by the engagement of the cam follower portion 166 with the cam portion 164 of cam 154.

As can be appreciated, the outward movement of the engaging portion on segment 144 applies increasing engaging force on the end note responsive to the end note not moving with the picking member. In addition the engaging portion of segment 144 operates to move further radially outward with an increasing difference between the movement of the picking member and the movement of the note. This outward movement may continue until the segment 144 reaches the full extent of its travel as limited by the cam surface.

Figure 8:
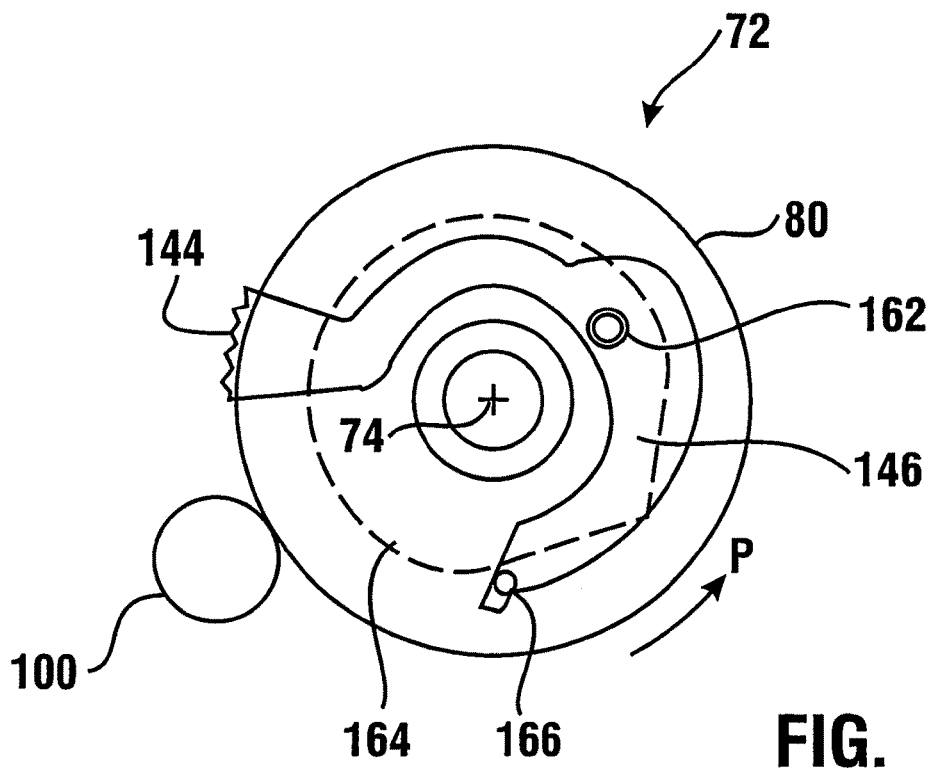

As shown in FIG. 8, if the end note has not initially moved in coordinated relation with the picking member, the engaging portion of the arcuate segment 144 will generally remain extended radially outward relative to the outer bounding surface of the picking member as the picking member further rotates. This provides additional force tending to assure that the note is moved from the stack. It should be appreciated that once the note begins moving, if note movement begins to exceed that of the picking member, the engaging portion of the arcuate segment 144 will begin to retract radially inward toward the outer bounding surface 80. Generally however once the engaging portion has extended radially outward, it will remain outwardly extended to the extent permitted by the engagement of the cam follower portion 166 with the cam surface 164.

Figure 9:
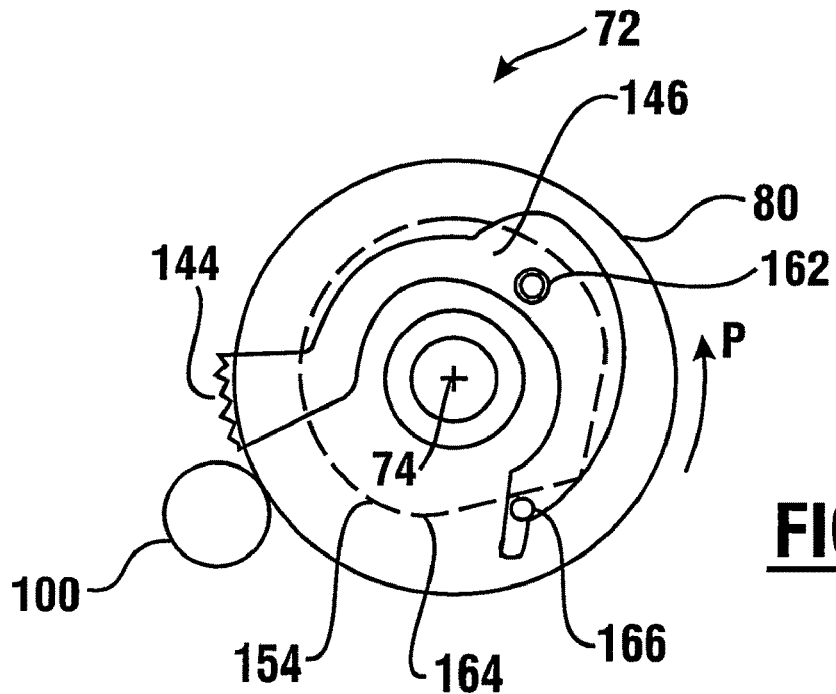

As shown in FIG. 9, as the picking member 72 rotates further toward the position where the engaging portion of the arcuate segment 144 approaches the stripping members, the profile of the cam surface 164 causes the cam follower portion 166 to cause the movable member 146 to rotate relative to the pivot connection 162. As shown in FIG. 9 the cam surface tends to rotate the movable member 146 in a generally opposed rotational direction about pivot connection 162, a direction in which the movable member rotates to extend the arcuate segment. As a result, as the picking member rotates so that the arcuate segment approaches the stripping member, the arcuate segment tends to move radially inward toward the outer bounding surface 80.

Figure 10:
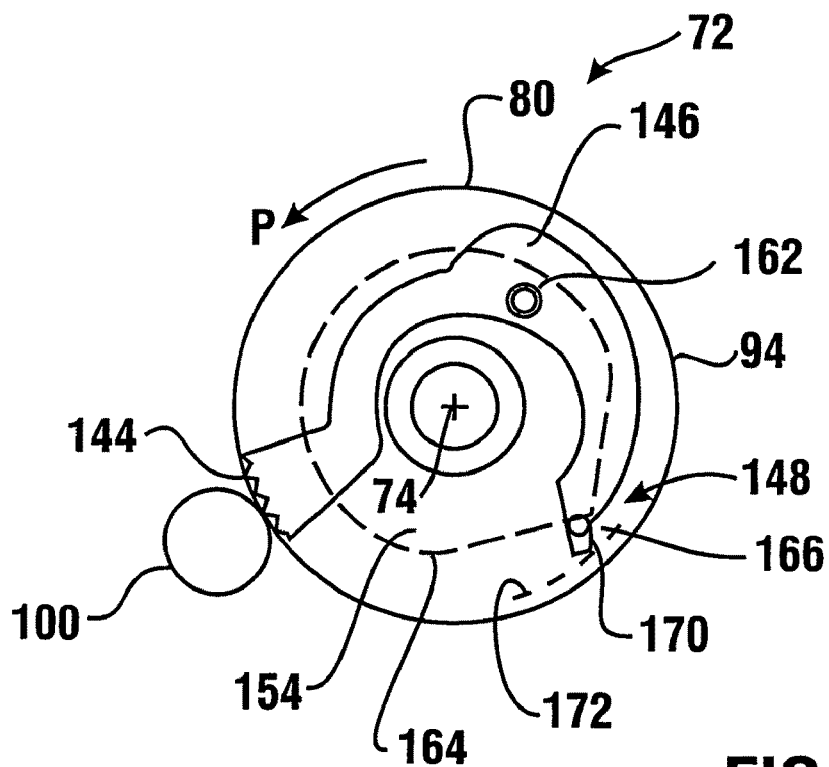

As shown in FIG. 10 once the picking member 72 has rotated to the point where the engaging portion of segment 144 is in abutting relation with the stripping member, the operation of the cam surface 164 and the cam follower portion 166 has caused the engaging portion to be retracted through movement of the movable member 146. The outer surface of segment 144 at this point is moved to generally conform with the outer bounding surface 80 of the picking member. In addition as the engaging portion on the segment 144 retracts radially inward, the engaging portion applies a decreasing engaging force to the end note as the end note is moved between the picking member and the stripping member. This decreasing force not only avoids collisions between the engaging portion and the stripping members, but it also prevents possible damage to the mechanism as well as to the notes being picked.

As shown in FIG. 10 the exemplary embodiment includes a stop portion 170 on the movable member 146. The stop portion 170 engages a surface 172 bounding recess 148. The stop portion prevents the engaging portion on the segment 144 from being moved radially inward substantially beyond the outer bounding surface 80 of the picking member.

As can be appreciated this exemplary embodiment of the picking member provides increasing engaging force on the end note responsive to the end note not moving with the picking member. As a result additional picking force is applied in only those circumstances where it is required to move the end note from the stack. In circumstances where notes are soiled, have high surface tension or are of slippery consistency, additional moving force is usually automatically applied. Further this exemplary form of the picking member also enables compensating for wear or reduced friction with soiling that may result from extended use of a picking member. In this way the exemplary form of the picking member is able to compensate for those conditions which might otherwise result in a decrease in note picking reliability.

It should further be understood that while in the exemplary form of this picking member the engaging portion is moved radially outward and applies additional picking force based on the relative movement between the end note and the picking member, in other embodiments other approaches may be used. Such approaches may include for example, other devices and systems for determining a difference in relative movement between the notes being picked and the picking member, and moving in engaging portions to apply additional engaging force in response thereto. Although the exemplary form of the invention uses a mechanical type system to accomplish this, electronic and electromechanical systems may be used in other embodiments.

A further useful aspect of the exemplary form of the first embodiment of the picking member and its operation in connection with dispensing mechanisms, is that it may be readily retrofit to an existing automated banking machine. The exemplary form enables a service technician to access an interior area of an ATM such as by unlocking a door to a secure chest portion. Once access is gained to the note handling mechanism, the technician may remove an existing picking member which does not include the features of the radially movable engaging portions, and to install a picking member 72 in place thereof. In the exemplary embodiment the support member portions 142 and 158 are configured to engage existing surfaces within the housing of the ATM so as to hold the cams stationary as the picking member rotates. Once installed in the ATM, the door to the secure chest portion is closed and locked.

Picking member 72 is constructed to have the same general profile as picking members that do not incorporate the exemplary enhanced picking features. Thus, installation of the exemplary picking member is readily made to improve the operation of the machine. It should further be understood that the programming of the controller 22 also often need not be changed to accommodate the installation of the picking member 72. Except as described herein, the operation of the picking member 72 is similar to that of a picking member which may be replaced in terms of moving and retracting notes.

Alternative embodiments of the automated banking machine may include other types of sheet dispensing mechanisms. Features of an alternative sheet dispensing mechanism 210 are described in connection with FIGS. 19-21. Sheet dispenser 210 operates based on principles similar to those described in connection with the first embodiment except as specifically described herein.

Sheet dispenser mechanism 210 includes a rotatable picking member 212. Picking member 212 includes a shaft portion 214 that extends along a central axis schematically indicated 216. In the exemplary embodiment shaft portion 214 is rotated about axis 216 by a drive such as a stepping motor which is not separately shown. The picking member may alternatively be referred to herein as a picker member.

Picking member 212 includes a middle disk portion 218. Middle disk portion 218 in the exemplary embodiment is in fixed connection with the shaft portion 214 and rotates therewith. Picking member 212 further includes an outboard disk portion 220 which is disposed from the middle disk portion on a first axial side. Outboard disk portion 220 is also in fixed connection with the shaft portion 214 and rotates therewith. An outboard disk portion 222 is disposed on an opposed axial side of middle disk portion 218. Outboard disk portion 222 is also in fixed connection with the shaft portion and rotates therewith. Because the middle disk portion 218 and the outboard disk portions 220 and 222 are each in fixed engagement with the shaft portion, they maintain their relative angular positions as the shaft portion is rotated during the picking of notes.

In the exemplary embodiment, middle disk portion 218 is comprised of a generally rigid plastic material. The middle disk portion includes a low friction arcuate surface 224 that extends angularly around a substantial portion of the middle disk portion. Low friction arcuate portion 224 has extending therein a recess (not separately shown). A band 226 of generally higher friction resilient material extends around the middle disk portion in the recess. The band 226 and recess include an enlarged area 228 in which the band extends across most of the outer surface of the middle disk portion. As later described in detail, the enlarged area 228 of the band serves as a high friction arcuate segment that facilitates the picking of notes from a stack.

Outboard disk portion 220 in the exemplary embodiment is also comprised of generally rigid low friction material. Outboard disk portion 220 includes an outer surface 230 which includes a recess therein (not separately shown). A band 232 of resilient material extends in the recess and extends around the entire circumference of the outer surface. The band 232 includes a high friction segment 234. The high friction segment 234 corresponds in angular position to at least a portion of the enlarged area 228 on the middle disk portion. In the exemplary embodiment of outboard disk portion 220, flange portions 236 bound the recess and the band 232. The flange portions 236 extend further radially outward relative to axis 216 than the outer surface of the band 232 except in the area of the high friction segment 234. In the area of the high friction segment the band 232 extends radially outward beyond the radial height of the flange portions 236 so as to facilitate picking.

Outboard disk portion 222 is similar in structure to outboard disk portion 220. Outboard disk portion 222 includes an outer surface 238 which includes a recess and in which a band 240 extends. The outer surface 238 includes flange portions 242 which bound the recess and the band. Band 240 includes a high friction segment 244 which extends radially outward beyond the flange portions. High friction segment 244 is generally aligned angularly with high friction segment 234 on outboard disk portion 220.

A stripping member 246 is positioned in opposed engaging relation with the middle disk portion 218. In the exemplary embodiment the stripping member 246 comprises a roll which is supported on a shaft 248. The stripping member 246 has in connection therewith a one-way clutch which may operate in the manner previously described. The clutch operates to resist rotation of the stripping member in a direction in which the stripping member is urged to move by engagement with the middle disk portion, but enables the stripping member to rotate readily in an opposed direction so as to enable the return of notes into the stack. In the exemplary embodiment stripping member 246 has a guide member 250 that extends in overlying relation thereof. The guide member includes an upper surface which has a contour that facilitates the directing of notes into the nip area where the stripping member 246 engages the middle disk portion (see FIG. 20).

In the exemplary embodiment the stripping member 246 is positioned relative to the middle disk portion 218 such that the surface of the stripping member is in opposed engaging relation with the surface of the low friction arcuate portion 224 of the middle disk portion. As a result the stripping member 246 which is biased to engage the middle disk portion in a manner later discussed, generally slides readily relative to the middle disk portion except when the surface of the stripping member is engaged in the enlarged area 228. When the enlarged area 228 is in abutting opposed relation with the stripping member, the end note bounding a stack of notes is stripped from the other notes in the stack in a manner that is later discussed.

Figure 18:
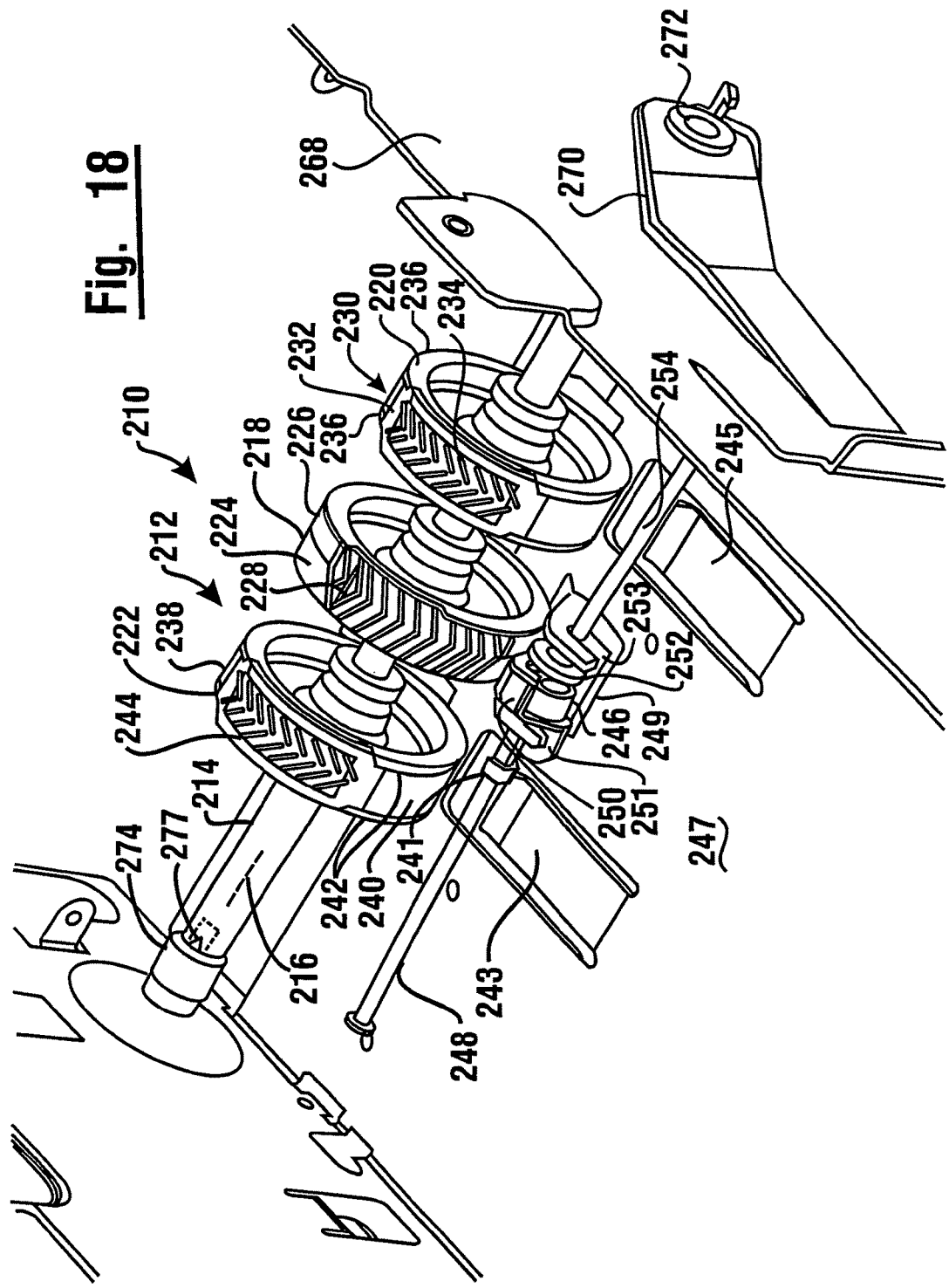
FIG. 18 is a top right isometric view of an alternative form of a picking member and stripping member adapted for minimizing the nicking and crumpling of notes during picking.
Figure 20:
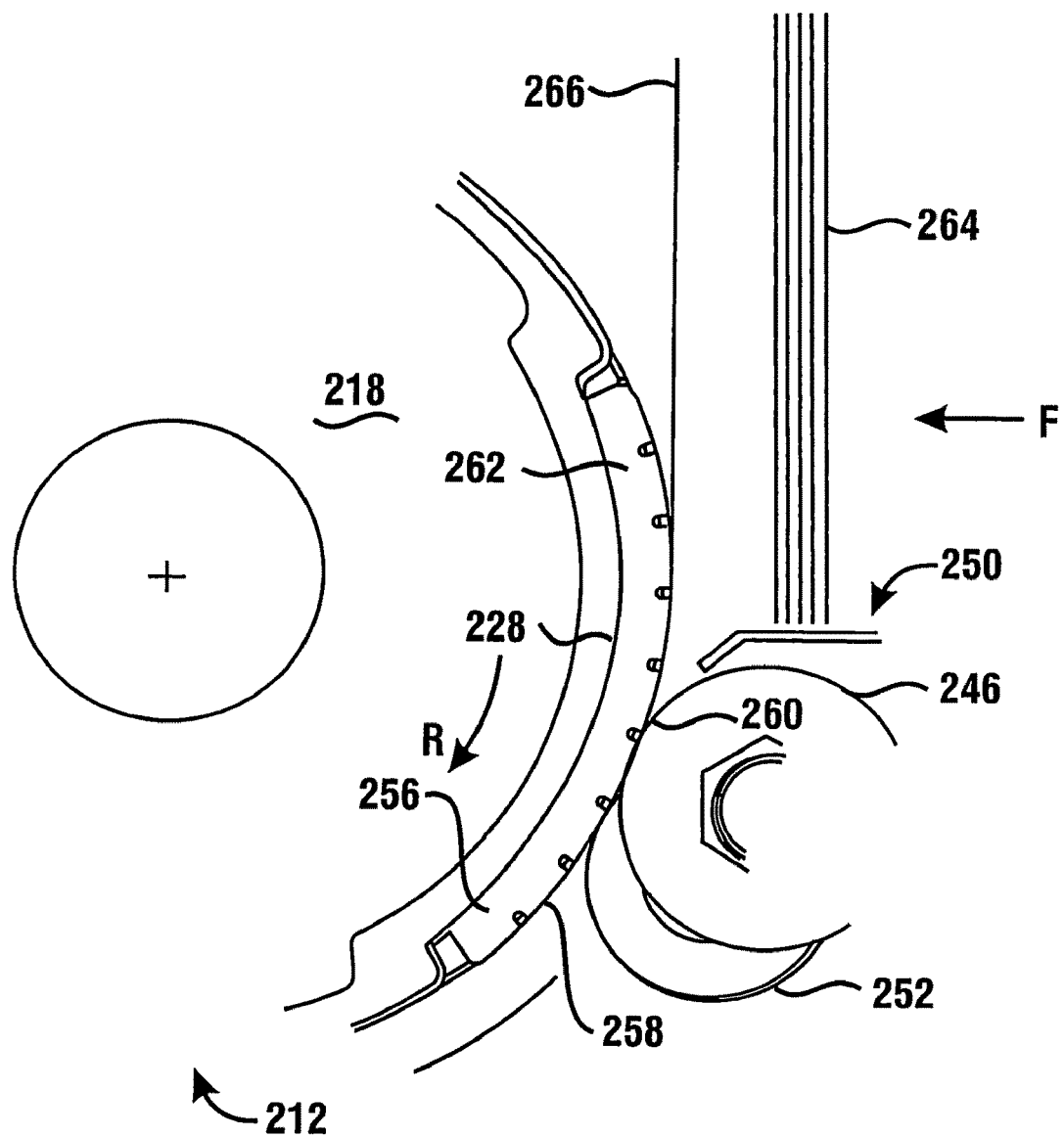
FIG. 20 is a left side view of the middle disk portion of the picking member, stripping member and takeaway roll in engagement with an end note bounding a stack.

As shown in FIG. 18 a carry away member which in the exemplary embodiment comprises a roll 252 is also mounted in opposed engaging relation with the middle disk portion 218. The carry away roll 252 is supported on a shaft 254 and is biased to engage the middle disk portion. The carry away roll 252 is aligned with the area of the recess in the middle disk portion that extends about the entire circumference of such disk portion. As a result the carry away roll generally remains in engagement with the resilient band 226 throughout the entire rotation of the middle disk portion except during the time that a note is moving therebetween. The exemplary form of carry away roll 252 is disposed downward and in an angular direction away from the stripping area in which the stripping member 246 engages the middle disk portion. This is shown in FIG. 20. As a result in the exemplary embodiment the carry away roll operates to engage a note that has been separated from the stack by the action of the stripping member and the enlarged area 228, and moves the separated note responsive to the movement of the picking member so that the separated note is moved away from the stack. In some embodiments this may avoid the need for a separate drive device for carry away rolls, as the movement of the picking member itself drives the carry away roll to move separated notes away from the stack.

As shown in FIG. 18 a lower housing wall 247 supports a support member 249 thereon. Support member 249 includes slots 251 and 253 therein which accept shafts 248 and 254 therein, respectively. Wall 247 also has integrally formed therein leaf springs portions 243, 245. Leaf spring portion 243 biases shaft 245 and stripping member 246 toward middle disk portion 218 by biasingly engaging a clip portion 241 of member 250. Spring portion 245 acts on shaft 254 to bias carry away roll 252 to engage the middle disk portion. The ends of each shaft 248 and 254 opposed of the roller is mounted in supporting connection with the housing through a releasible pivot connection (not separately shown) which enables each roll to maintain biasing engagement with the middle disk portion. The pivot connection enables each of the stripping member and carry away member and their respective shafts to be released from operative supporting connection from the housing and replaced. Of course, in other embodiments other releasible mounting arrangements may be used.

Figure 19:
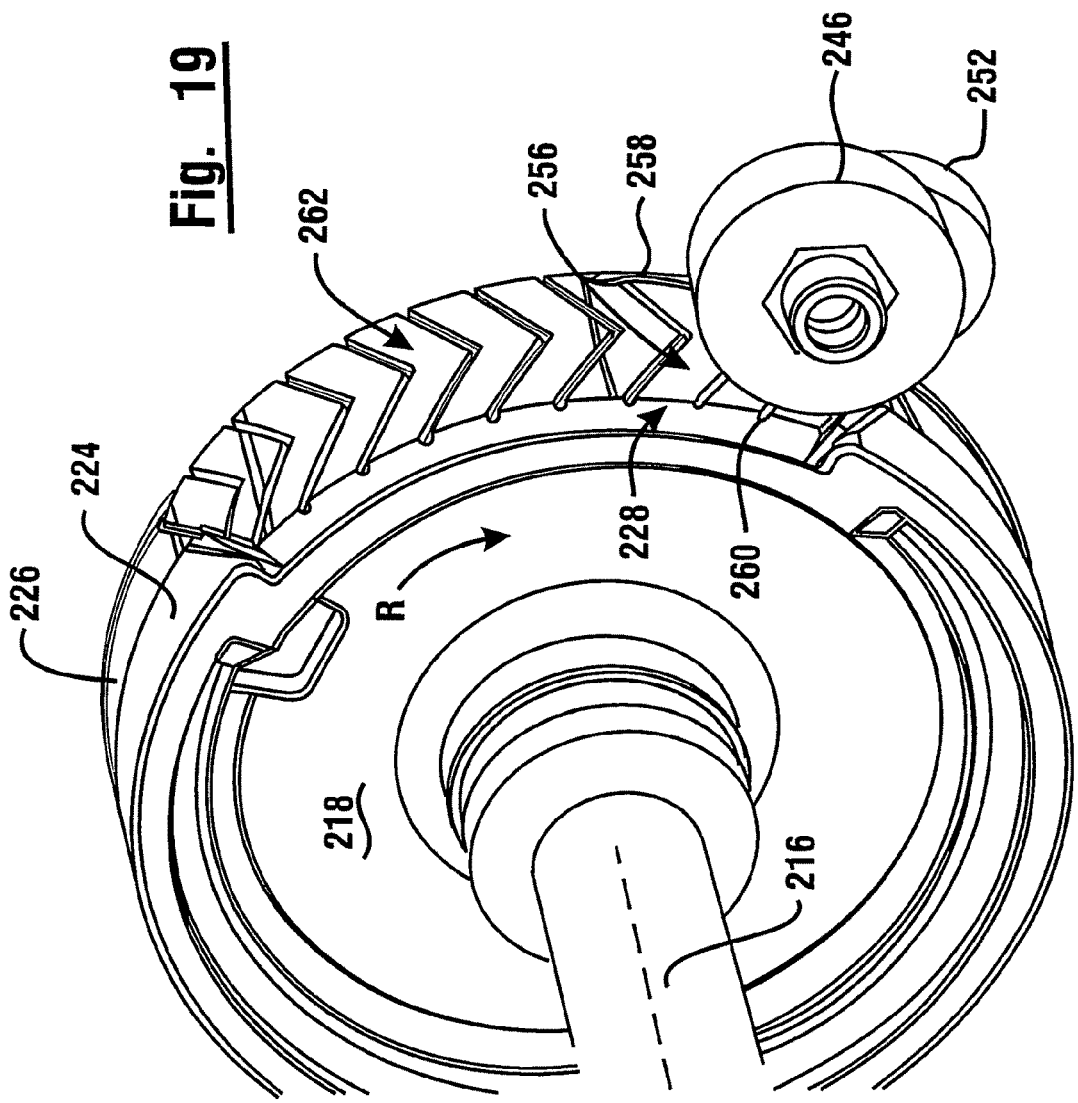
FIG. 19 is a left isometric view of a middle disk portion of the picking member, stripper member and takeaway roll shown in FIG. 18.

As shown in more detail in FIG. 19 the enlarged area 228 on the middle disk portion 218 includes a leading area 256. The leading area 256 has extending transversely adjacent thereto, an arcuate projecting portion 258. The arcuate projecting portion 258 in the exemplary embodiment comprises an extension of the outer surface of the middle disk portion 218. The arcuate projecting portion 258 extends radially outward relative to the axis beyond the outer surface of the band 226 in the leading area 256. The arcuate projecting portion is also disposed adjacent to but transversely away from a stripping area 260 in which the stripping member 246 engages the leading area 256 of the enlarged area 228 of the band.

In the exemplary embodiment the arcuate projecting portion 258 arcuately extends up to a driving area indicated 252 in the enlarged area 228 of the band. In the driving area the band extends further radially outward relative to the leading area 256. The driving area 252 generally corresponds angularly to the positions of the high friction arcuate segments 234 and 244 on the outboard disk portions 220 and 222 respectively. As shown in FIG. 19 the enlarged area 228 of the resilient band includes a ribbed design that is consistent across the leading area 256 and the driving area 262. In some embodiments the ribbed design may serve to provide desirable frictional properties for the band. Of course in other embodiments other designs for tread surfaces as well as other types of frictional materials may be used.

Figure 21:
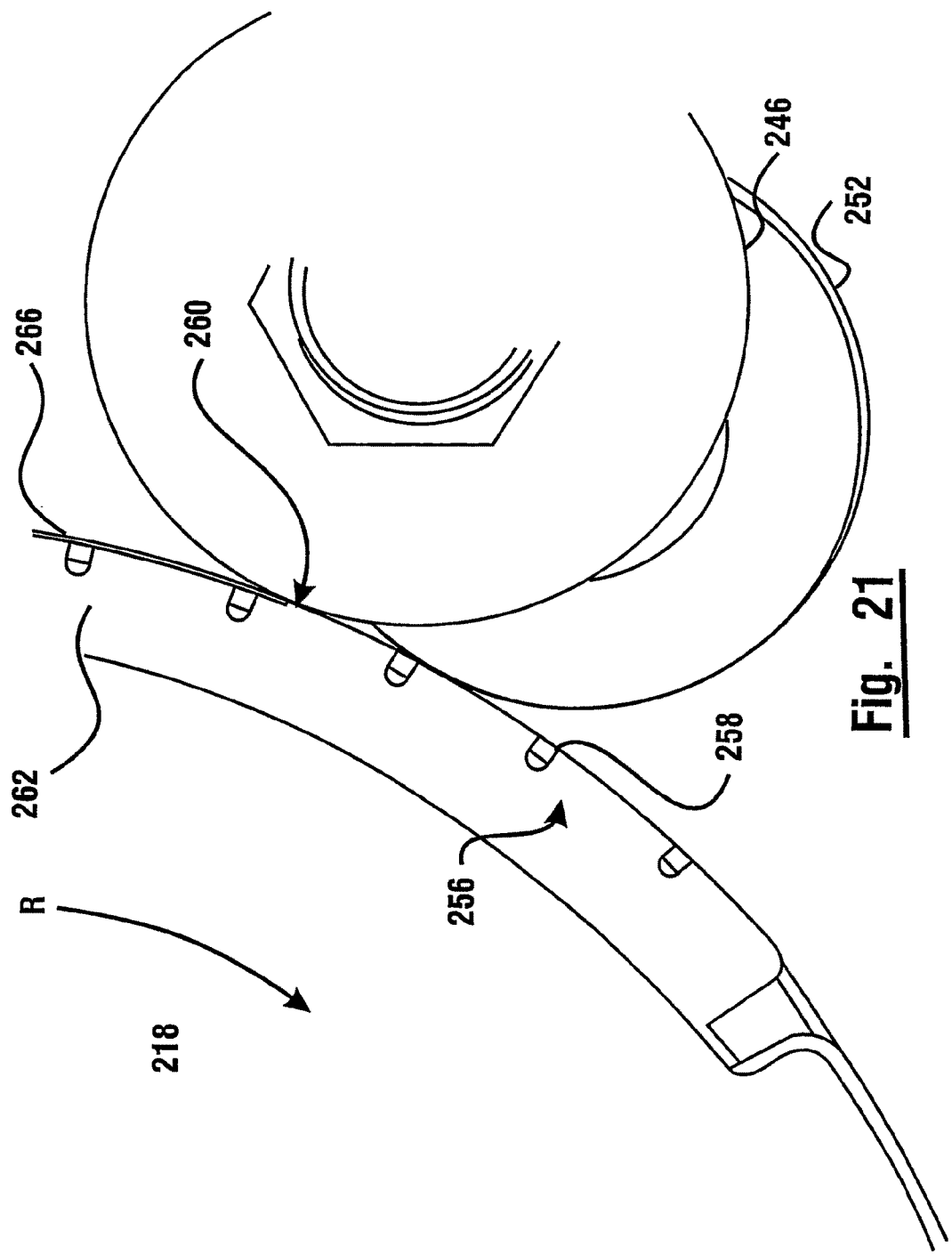
FIG. 21 is an enlarged view of the components shown in FIG. 20.

The operation of the alternative exemplary sheet dispensing mechanism 210 is now described with reference to FIGS. 19-21. A stack of notes schematically indicated 264 is bounded by an end note 266. In exemplary embodiments the stack 264 may generally be contained within a removable canister or other suitable holding container. Of course alternative approaches for holding a stack of notes may also be used. The stack 264 is biased in the direction of Arrow F in FIG. 20 by a suitable biasing device so as to urge the end note 266 of the stack to engage the picking member including disk portions 218, 220 and 222.

As in the previously described embodiment the end note 266 is separated from the stack by rotation of the picker member 212 in the direction of Arrow R as shown in FIG. 20. The rotation of the picking member 212 generally does not cause the end note 266 to move substantially relative to the stack except when the driving area 262 of the middle disk portion and the high friction segments 234 and 244 of the outboard disk portions are engaged with the end note. This is because of the relatively low friction engagement between the outer surfaces of the disk portions and the end note in the other areas about the circumference of the disk portions.

As the picking member rotates a full rotation the end note 266 is moved relative the stack. In the exemplary embodiment rotation of the picking member brings the leading area 256 adjacent the forward boundary of the enlarged area 228 of the band 226 on the middle disk portion into engagement the outer surface of the stripping member 246 in the stripping area 260 as shown in FIGS. 20 and 21. The forces of the relatively moving leading area and non-moving outer surface of the stripping member acting on a leading edge area and opposed sides of the end note cause the note to begin to be separated from and in many cases to begin moving responsive to the rotation of the picking member relative to the stack. However, in the exemplary embodiment while the leading edge area of the end note 266 is engaged with the leading area 256 of the picking member, the end note is also engaged with the surface of the transversely adjacent arcuate projecting portion 258 of the middle disk portion. This engagement of the end note with the arcuate projecting portion in a support area that is adjacent, but somewhat axially transversely disposed from the stripping area, serves to support the note and to reduce the risk that the leading edge area of the note will be deformed such as crumpled or nicked by the opposed forces imparted to the note by the action of the enlarged area of the band and the stripping member. Thus the surface of the arcuate projecting portion serves to prevent excessive deformation of the note along a direction which the note is urged to move by the picking member due to the opposing force applied by the stripping member. The angled treads of the exemplary picking member underlying the leading edge area of the note in opposed relation of the stripping member further serve to enable relative movement of the picking member with regard to the note without causing potentially damaging deformation.

Further rotation of the middle disk portion in the direction of Arrow R causes the arcuate projecting portion to rotate beyond the stripping area where the stripping member 246 engages the enlarged area 228. Further such rotation causes the driving area 262 which has an outer surface that extends further radially outward from the leading area to engage the adjacent surface of the end note. This imparts additional force urging the end note 266 to move relative to the stack. Further at generally the same time during the rotation of the picking member, the high friction arcuate segments 234 and 244 on the outboard disk portions also act on the end note further urging it to move relative to the stack. These forces acting on the end note cause the end note to move further in intermediate relation between the band 226 and the stripping member 246 and to engage the carry away roll 252. The end note 266 moves in engaged intermediate relation between the band 226 on the middle disk portion and the carry away roll 252 which further helps to move the end note away from the stack and the picking member.

Of course as previously described in connection with the other exemplary embodiment, if a double note is sensed as having been picked, the controller may be operative to cause the direction of the picking member to be reversed. This is done before the note is disengaged from the picking member so as to move the note back into the stack. Thereafter the controller may operate to cause the picking member to again attempt to pick the end note so that it is separated from other notes in the stack.

The features described in connection with the sheet dispensing mechanism 210 may prove useful in circumstances where the notes or other sheets that are to be picked may tend to be crumpled or have the leading edge thereof nicked or torn by the forces imparted to the sheet as a result of stripping action. In the exemplary embodiment the forces imparted to the sheet initially by the leading area serve to move a central portion of the leading edge of the sheet into the nip formed by the middle disk portion and the stripping member, while a transversely adjacent area is supported by the low friction arcuate projecting portion, is operative to reduce the likelihood of nicking or crumpling the notes in the area where the stripping forces are applied to the notes. Such features may be particularly helpful in the case of thin, flexible and/or fragile notes or media that is susceptible to crumpling or tearing. Further, avoiding deformation of the leading edge of the notes also reduces the risk that such a deformed or damaged note will be sensed by a doubles detector as a double or other unrecognizable note. This reduces the risk that such a note will be retracted into the stack. Such retraction of a properly picked single note may not be necessary. Further in some embodiments a return to the stack and additional attempts to pick the note from the stack may result in further damage or tearing of the note. This may pose additional complications and/or may cause the machine to be placed out of service.

It should be understood that the structures shown in connection with the sheet dispensing mechanism are exemplary and in other embodiments other approaches of providing stripping action while simultaneously providing support in a support area so as to minimize sheet damage may be used. For example in some embodiments additional surfaces or devices for providing support may be provided on the picking member, the stripping member or on other structures. Further it should be understood that although in the described embodiment a single stripping member is utilized, the principles described may be applied to devices in which multiple stripping members are used.

As shown in FIG. 18, the exemplary embodiment of the sheet dispensing mechanism 210 also provides for ready change of the picking member 212. In this exemplary embodiment the housing 268 which supports the sheet dispensing mechanism includes a tab portion 270 thereon. Tab portion 270 includes a bushing 272 adjacent to a free end thereof. Bushing 272 is adapted to accept therein a cylindrical projecting portion at the end of shaft portion 214. This projecting portion is readily releasibly engageable in the bushing 272 in the exemplary embodiment. The end of shaft portion 214 opposed of the bushing 272 is releasibly engageable with a drive shaft 274. In the exemplary embodiment the drive shaft 274 includes a cylindrical projecting portion that extends in a mating recess within the shaft portion 214. A driving projection in operative connection with the drive shaft 274 is accepted in a corresponding recess in the shaft portion 214 so as to provide generally solid rotational driving engagement between the drive shaft 274 and the picking member 212. As a result, in the described exemplary embodiment the picking member 212 may be replaced by deforming the resilient tab portion 270 outward relative to the housing 268. This provides additional clearance such that the shaft portion 214 may be disengaged from the drive shaft 274 and the bushing 272. Thereafter a substitute picking member may be inserted and will be held in place by the inward biasing force of the tab portion 270. Of course this approach is exemplary and other approaches may be used.

In the exemplary embodiment, before the picking member is removed from supporting connection with the housing it is generally advisable to dispose the stripping member and carry away member away from the middle disk portion. This provides greater access to the picking member and enables it to be moved out of the housing for inspection or replacement purposes. In addition, it is occasionally necessary to replace the stripping member and/or carry away member for purposes of ensuring the reliable operation of the machine. As can be appreciated, in some situations the stripping member may become worn over time due to repeated contact with note surfaces. Alternatively or in addition, the surface of the stripping member may become contaminated due to the presence of dirt or other material on the notes being dispensed. The surface of the carry away member may also become contaminated for similar reasons which may reduce its efficiency in engaging and urging notes to move between the carry away member and the central disk portion.

When it is desired to move the stripping member 246 away from the middle disk portion 218, a servicer gains access to the appropriate area of the housing 268. This is done in the exemplary embodiment by moving the currency holding canister or cassette which houses a stack of bills or other sheets and which enables the end note in the stack to be biased into adjacent relation with the picking member. Once the sheet holding structure has been removed from the housing, a servicer may manually deform leaf spring portion 243 so as to move the free end of the leaf spring downward such that it no longer holds the stripping member 246 in adjacent relation of the picking member. This can be facilitated in the exemplary embodiment by the servicer applying a force to the stripping member or the shaft 248 so as to initially move the stripping member slightly toward the axis of rotation of the picking member. This enables the leaf spring portion to disengage and to be moved such that the free end thereof is disposed below the shaft 248 and the clip portion 241 of bracket 250. This enables the stripping member 246 to be moved axially away from the axis of rotation of the picking member outward through the slot 251. As previously discussed, in the exemplary embodiment the shaft 248 is in supporting connection with the housing through a pivot mounting such that the stripping member moves arcuately away from the axis of the picking member. Of course this approach is exemplary, and in other embodiments other approaches may be used.

In the position with the stripping member moved away from abutting relation with the picking member, a servicer is enabled to maintain the stripping member disposed away from the axis of the picking member for purposes of inspection or replacement of the picking member. Alternatively, in the exemplary embodiment the stripping member and shaft assembly is enabled to be removed from its mount for purposes of inspection or replacement. As a result, a servicer is enabled to replace a stripping member, guide member, shaft or entire assembly, as required. In addition in the exemplary embodiment, the stripping member has an integral one-way clutch which, as previously discussed, facilitates dealing with situations where multiple sheets are inadvertently picked.

Once the desired parts are replaced, the shaft 248, stripping member and guide member assembly may be engaged with the mounting mechanism to again place them in supporting connection with the housing, and the stripping member moved toward the axis of rotation of the picking member. As this occurs, the shaft 248 moves into the slot 251. Once the stripping member is in the operative position, the leaf spring portion 243 which is biased downward by the clip portion 241 as the stripping member moves into the operative position, is enabled to move upward to engaged the clip portion. This action of the leaf spring portion holds the stripping member in the operative position in biased abutting relation with the central disk portion.

A mounting approach similar to that used for the stripping member may be used for the carry away roll 252. The carry away roll, which is transversely disposed from the stripping member and disposed in the direction of note movement from the point of engagement of the stripping member with the central disk portion, is biased toward engagement with the middle disk portion and held through the action of leaf spring portion 245. Leaf portion 245 in the operative position has a free end which engages shaft 254 which is in supporting connection with the carry away roll. In the operative position, shaft 254 extends in slot 253 so as to maintain its position relative to the central disk portion. Shaft 254 at an end opposed of the carry away roll is also movably mounted in supporting connection with the housing through a mount which is not separately shown. Of course this approach is exemplary, and in other embodiments other approaches may be used.

In the exemplary embodiment the carry away roll 252 is enabled to be moved away from the axis of the picking member. This is accomplished by a servicer deforming leaf spring portion 245 so that is no longer engages shaft 254, so as to hold the carry away member in the operative position. In the exemplary embodiment this may be facilitated by the servicer biasing the shaft and/or carry away member slightly towards the picking member while deforming the leaf spring portion 245 such that the free end thereof may pass underneath shaft 254. Shaft 254 may then be moved rearward away from the axis of rotation of the picking member through the slot 253. Again, in this position the carry away member may be maintained so as to provide access for inspecting or replacing the picking member. Alternatively in the exemplary embodiment, the carry away roll may be replaced along with the shaft 254 by disengaging the shaft from its mounting mechanism.

When it is desired to return the carry away roll to the operative position after service activities or replacement, the shaft 254 is returned to its rotatable mounting mechanism and the carry away roll 252 is moved toward the axis of rotation of the picking member and into the slot 253. As this occurs, the leaf spring portion 245 has the free end thereof biased downward until the shaft 254 passes the free end. Once the shaft 254 has moved sufficiently forward toward the axis of the picking member, the free end of leaf spring portion 245 moves upward to hold the shaft into a position which is biasingly toward engagement with the middle disk portion.

It should also be noted that this exemplary approach has the advantage that the carry away roll and stripping member may be disposed from the support member 249. This also enables more ready replacement of the support member in the event that the support member sustains breakage or wear. Such replacement may be accomplished through the use of various fastener mechanisms which are operative to releasibly hold the support member in engagement with the housing. It should also be understood that in conducting servicing activities in the exemplary embodiment, generally it will be desirable to move the stripping member and carry away roll to the operative position once the picking member is in place in supporting connection with the drive shaft 274 and the tab portion 272. However, in some circumstances servicers may find it useful to move one or both of the stripping member and carry away roll into the operative position and then to install the picking member into engagement with the drive shaft and tab portion. The approach used will depend on the circumstances and the nature of the servicing activity.

Figure 12:
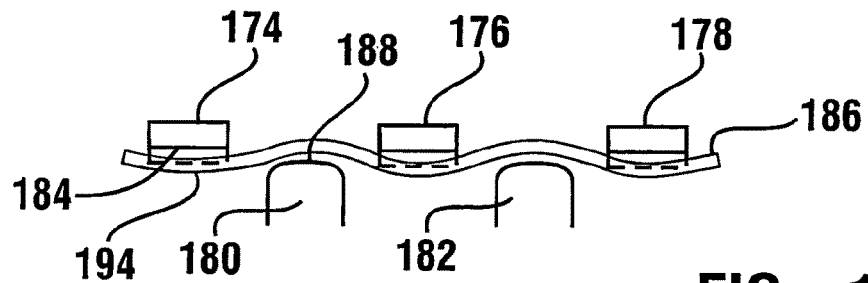
FIG. 12 is a side cross sectional view of the sheet transport showing a sheet in engagement with a plurality of belt flights and projecting member portions.

In an exemplary embodiment a note transport such as note transport 54, includes features to reduce the risk that notes may become stuck or jammed in the transport. As previously discussed in connection with FIG. 1, note transport 54 includes a plurality of continuous belts 56 which extend about sets of rollers 58. It should be understood that the transport 54 may include belts that extend the entire length of the transport or may have several belts which span sections of the transport. In an exemplary embodiment the continuous belts are arranged so that the transport includes a plurality of generally parallel belt flights. These belt flights are represented in FIG. 12 by belt flights 174, 176 and 178. Each of the belt flights extend along a longitudinal direction of the transport, in which longitudinal direction sheets are moved. The belt flights are moved through operation of a drive or similar moving mechanism which is controlled responsive to operation of the controller 22 and which drives the rollers upon which the belts are supported.

As shown in FIG. 12, disposed transversely intermediate of each adjacent pair of belt flights, are projecting member portions 180, 182. As can be readily seen from FIG. 12, each of the belt flights has a first sheet engaging surface represented by surface 184 of belt flight 174, which faces in a first facing direction toward a sheet 186 which extends in the transport. The projecting member portions each include a second sheet engaging surface represented by surface 188 of projecting member portion 180. The second sheet engaging surface 188 faces in a second facing direction which is generally opposed of the first facing direction. As will be appreciated the first and second facing directions in which the sheet engaging surfaces of the belt flights and the projecting member portions extend respectively, are both generally normal of the longitudinal direction in which the sheets move.

Figure 13:
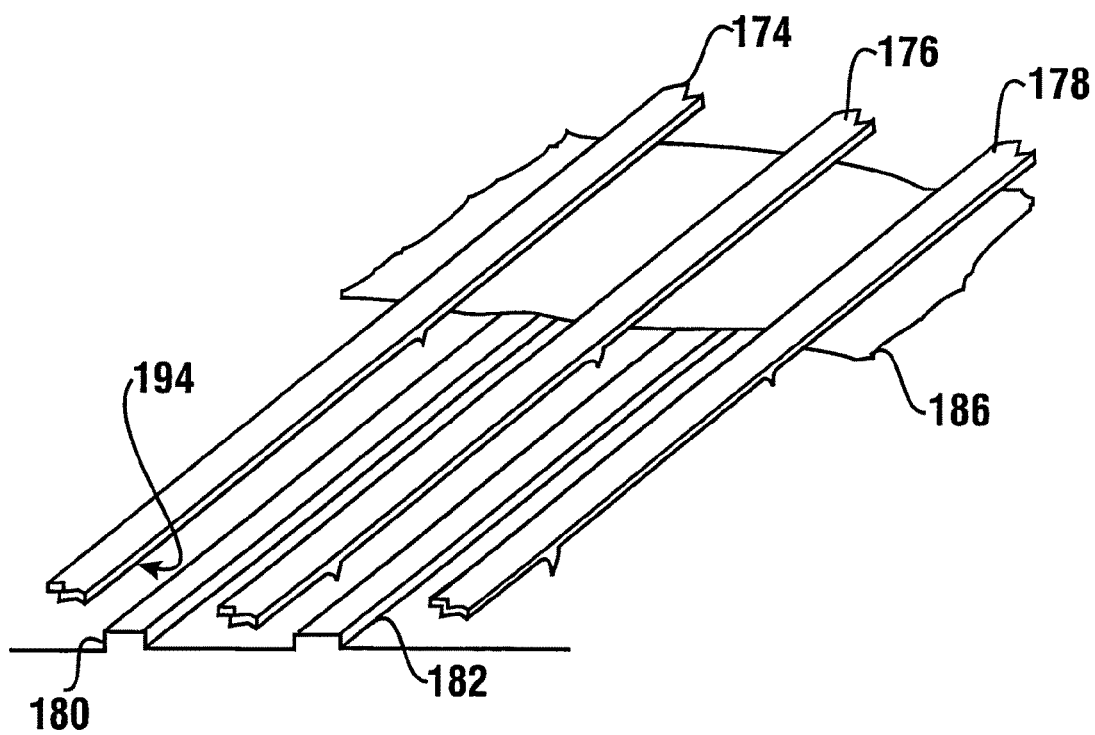
FIG. 13 is an isometric view of a sheet transport including belt flights of the type shown in FIG. 11 operating to move a sheet through the transport.

As can be appreciated from FIGS. 12 and 13, the configuration of the first belt flights and the sheet engaging member portion is such that a sheet that is moved into intermediate relation between the first sheet engaging surface of the belt flights and the second sheet engaging surfaces of the projection member portions, is deformed in a wavelike configuration so that the sheet is engaged with the belt flights. As a result when the belt flights move, the sheet 186 moves in engagement therewith.

As can be appreciated from FIG. 14, the sheet transport 54 is enabled to accept sheets such as a sheet 190 through openings such as opening 192. As can be appreciated, from FIG. 14, a sheet passing through the opening in the projecting member portions moves in engagement with the first belt flights to become trapped in sandwiched relation between the belt flights and the projecting member portions. The sheet once trapped in this manner is caused to be moved along with the belt flights to a desired location within the machine responsive to signals from the controller.

As mentioned previously, occasionally sheets such as bank notes become stuck in transports of this type. This may result due to various conditions which prevent the notes from moving in coordinated relation with the belt flights. In the exemplary embodiment conventional type belts which have in the past been used in transports of this type are replaced with alternative belts which reduce the risk that sheets will become stuck. Specifically while prior belts have a generally smooth continuous sheet engaging surface, the alternative belts used of the exemplary form include at least one longitudinally spaced projection which extends in the first facing direction from the sheet engaging surface of the belt. In a more preferred exemplary form such longitudinally spaced projections extend at spaced intervals on the first sheet engaging surface of the belt. The presence of such longitudinally spaced extending projections engage sheets that might otherwise not move in the transport and move them to the desired location.

Figure 11:
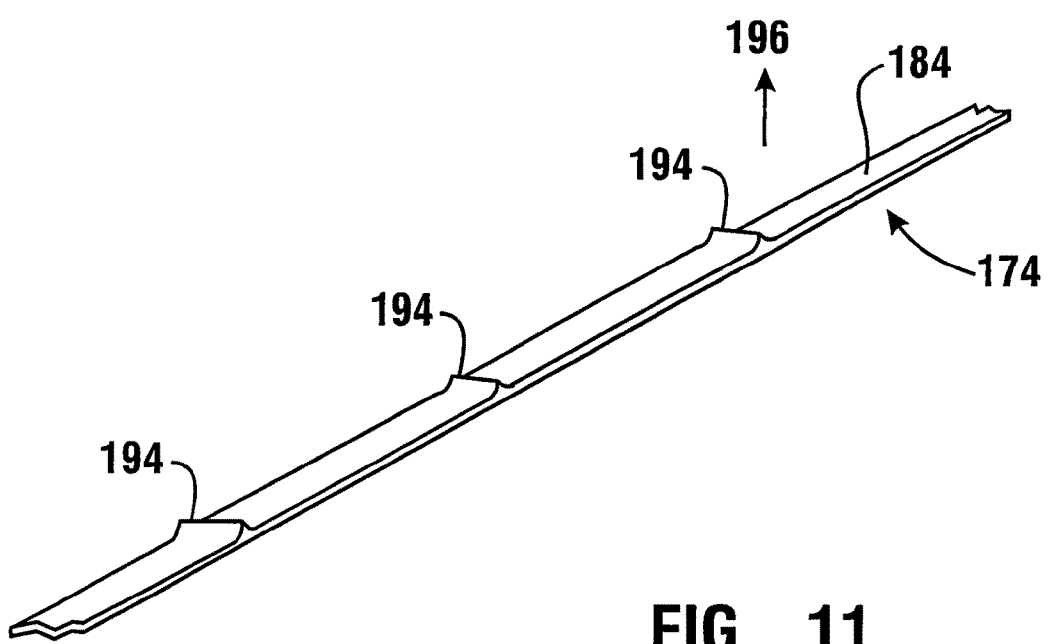
FIG. 11 is an isometric view of a portion of a belt flight including longitudinally spaced projections thereon.

FIG. 11 shows an isometric view of belt flight 174 with the first sheet engaging surface 184 thereof turned 180 degrees from that shown in FIG. 13. The first sheet engaging surface 184 includes a plurality of longitudinally spaced projections 194. The projections 194 extend generally in the first facing direction represented by arrow 196. In the exemplary embodiment, the projections 194 are deformable, resilient and spaced from one another a distance that is greater than the length of the sheets that are moved through the associated transport in the longitudinal direction. This enables a sheet to extend between the adjacent longitudinally spaced projections. It should be understood however that other embodiments may have projections with other properties and the projections spaced more closely together. Other alternative embodiments may have the projections spaced far apart, even to the extent of including only one such projection on the continuous sheet engaging surface of a belt.

In some embodiments all of the belts used in connection with a transport may include projections thereon. However in some embodiments it may be desirable only to replace certain belts with alternate belts including such projections. For example in the transport including three belt flights shown in FIG. 13, it may be desirable only to replace the middle belt with an alternate belt. Alternatively it may be desirable to replace the two outward belts with an alternate belt, leaving the middle belt as having a generally smooth continuous outer surface. Various approaches to replacing the belts may be taken depending on the particular type of documents being transported.

As shown in FIG. 13 some embodiments may have multiple belts arranged such that the projections that extend from the first sheet engaging surfaces of the belts are generally transversely aligned. In this way each of the longitudinally spaced projections will maintain generally the same spaced relation relative to the other projections as the belts are moved from the transport. Alternate embodiments may have the belts installed such that there is no predetermined relationship between the projections on each respective adjacent belt. In each situation benefit is obtained as the projections facilitate movement of sheets in the transport.

Figure 15:
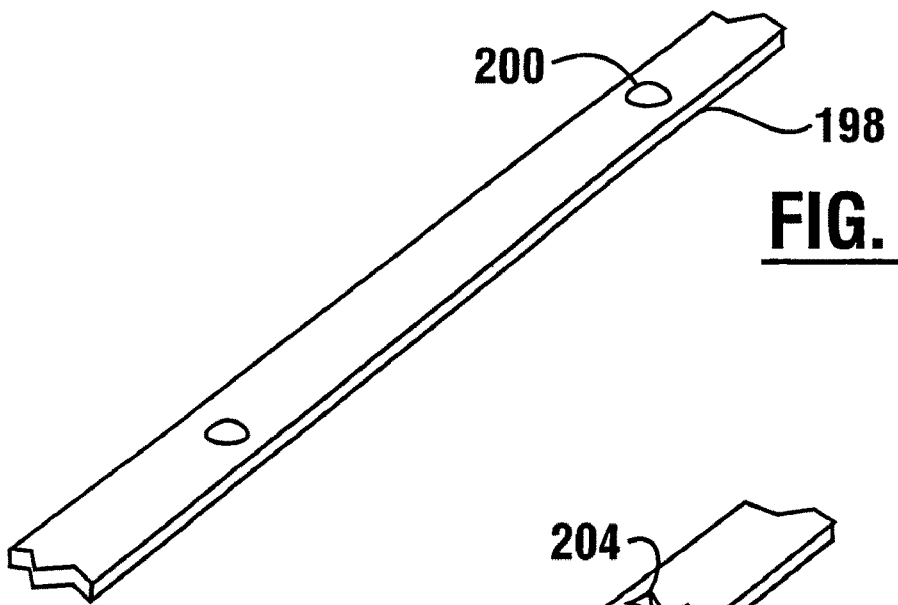
FIGS. 15-17 show alternative exemplary forms of projections positioned on belt flights which may be used in connection with sheet transports including the improvement of the present invention.
Figure 16:
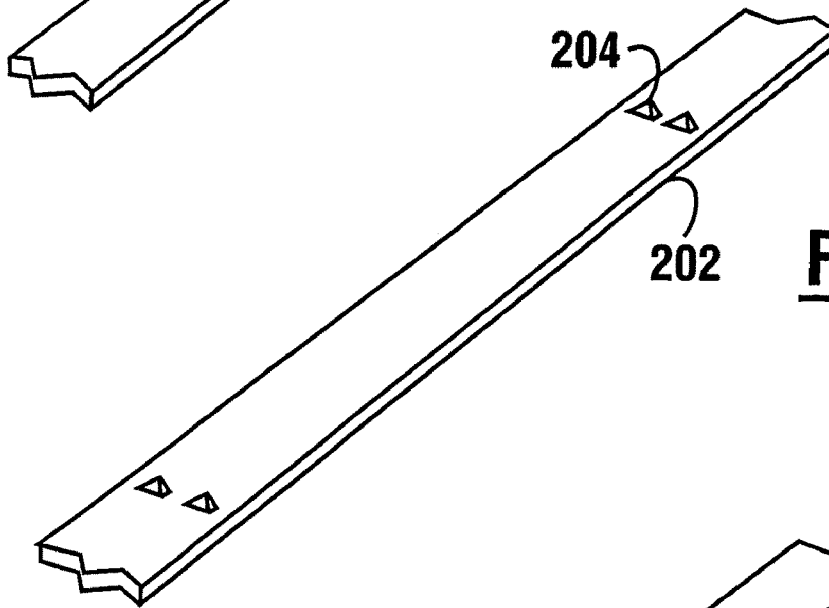
Figure 17:
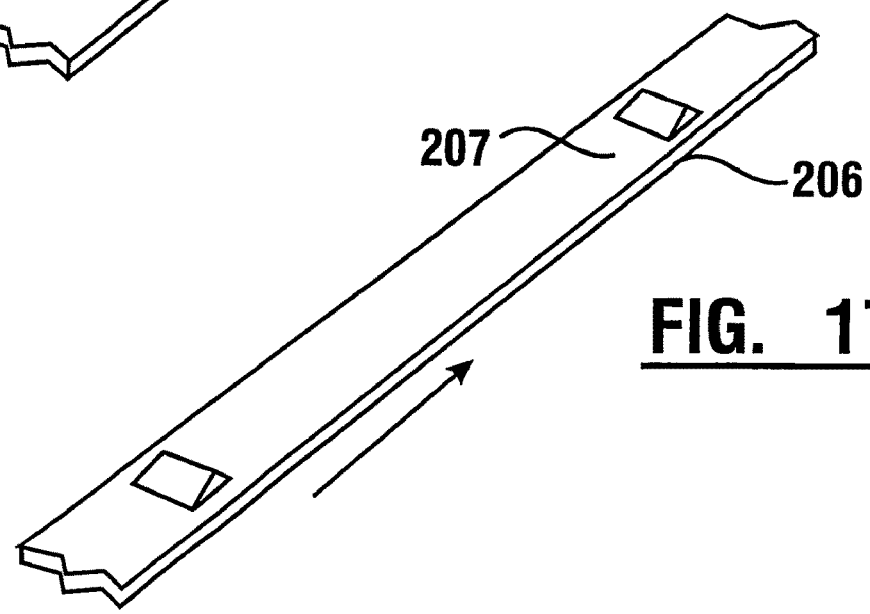

It should be understood that the configuration of belt flight 74 with the longitudinally spaced projections which extend across the first sheet engaging surface of the belt is exemplary. In other embodiments other types of projection configurations may be used. For example, FIG. 15 shows a belt flight 198. Belt flight 198 includes bubble type projections 200. FIG. 16 shows a further alternate belt flight 202 which has adjacent cone-like projections 204. FIG. 17 shows yet a further alternate belt flight 206. Belt flight 206 includes ramp-like projections 207. It should be understood that these belt and projection configurations are exemplary and in other embodiments other configurations may be used.

The exemplary form of the transport may be used in connection with existing transports which move sheets such as bank notes in an automated banking machine. Belts which include the improvement are made to extend about existing sets of rollers within the machines and to replace existing transport belts which have generally smooth continuous sheet engaging surfaces about the entire periphery thereof. To improve the performance of the transports in such machines, a service person must open the housing of the machine such as by unlocking and opening a door of a secure chest. The service person is then enabled to remove the existing transport belt from a set of rollers which support and move such belt. With the prior belt removed from the transport, an alternative belt of one of the types described herein including longitudinally spaced projections is installed in supporting connection with the set of rollers. The service person may then close and lock the door of the secure chest of the ATM. Sheets may be then moved in the transport urged not only by the relatively smooth portions of the sheet engaging surface of the belt, but further urged to move by engagement with the projections thereon. As can be appreciated, the projections on the belts provide additional urging force that is generally sufficient to move sheets that otherwise might slip or become stuck in a transport.

It should be appreciated that in the exemplary embodiment, the alternate belts described may be used in connection with transport 54 as well as transport 60. The principles may also be applied to other devices which move sheets within the machine. For example belts which include longitudinally spaced projections of the type described herein may be used in connection with a system for moving stacks of sheets such as is shown in U.S. Pat. No. 5,507,481, the disclosure of which is incorporated herein by reference as if fully rewritten herein. In such transports the projecting member portions comprise moving belt flights which move in coordinated relation with the facing belt flights and serve to transport stacks in between. Alternative belts including projecting portions thereon may be used to move stacks of sheets that are in between and enable movement of such stacks more reliably. As is explained in the incorporated disclosure, such transports in which the projecting member portions comprise moving belt flights enable reliably moving stacks of notes or connected sheets such as passbooks and checkbooks within an automated banking machine.

The principles described herein may also be applied to other types of stack and sheet transports including for example, stack accumulation and presentation mechanisms such as is found in U.S. Pat. No. 5,435,542, the disclosure of which is also incorporated herein by reference as if fully rewritten herein. Of course the principles may be applied to other transport mechanisms as well. It should be understood that the improved sheet dispensing functions achieved through utilization of one or more of the principles described herein may be incorporated in automated banking machines with the improved transport features to achieve improved reliability in moving and delivering sheets within the automated banking machine. Of course it should also be understood that in some embodiments the improved picking capabilities will be implemented without the improved transport capabilities and vice versa. The principles described herein may also be applied to other configurations of picking members and devices as well as sheet transports.

Many components inside of an automated banking machine (e.g., ATM) are designed to wear over time. At some point the ATM component or part is no longer performing the function it was originally designed to accomplish. For example, contact surfaces of picker rollers and belts may eventually wear down.

In many situations an ATM part is completely useful as it wears out. As a result, when an ATM is being serviced it is sometimes difficult to know if a particular part should be replaced. That is, it can be difficult to know if an ATM part is only slightly used or nearly completely used (i.e., worn out).

In an exemplary wear-determining arrangement, color is used to show the current wear state of an ATM part (picker wheel, stripper wheel, belt, etc.). That is, color is used to indicate component wear. Different colors can respectively indicate different states of component wear. The exemplary arrangement enables the component itself to be the primary indicator of its wear, instead of reliance on some other secondary factor.

For an ATM component (e.g., a picking surface or a belt surface), colors in the surface thickness can be layered or structured to enable the final color to become visible once the surface has lost its acceptable (high friction) properties. The component surface indicates when it is worn out and should be changed. The different exposed colors of an ATM component can correlate to its present wear status. The arrangement can result in prevention of unnecessary (too soon) component replacement, and thus extend component life.

An exemplary ATM currency dispenser can include a currency note picker wheel (or roller). A picker wheel may comprise a resilient band portion positioned on and around a cylindrical more rigid plastic roller portion. The band can comprise a high friction material, such as rubber. A picking member having a high friction arcuate segment has been previously discussed. Thus, the band section can act as the outer surface of the picker roller.

As previously discussed, the high friction arcuate segment is operative to engage and move a currency note from a note stack as the roller rotates during a note picking operation. Thus, this outer engaging surface can constitute a picking surface of the picker wheel.

The picking surface may include a tread section. The level of high friction caused by this resilient tread can allow the picker wheel to frictionally engage and properly pick currency notes. When the picking tread wears down too much, and causes a reduction in surface friction, then the picker wheel may perform more poorly during note picking.

Different color particles of the same material (e.g., rubber) can be located in the picking surface thickness of a picker wheel. Alternatively, the color particles may be of a material which has similar (picking) properties to the remainder of the surface material. Particles of a material comprising a different color and/or with different properties may be embedded in the surface material. The exterior picking surface would change color as it wears. Different visible patterns may also be used instead of or in conjunction with different colors. A service person can check a picker wheel surface's wear state by simple visual inspection thereof.

In an alternative wear detection arrangement, reliance on human vision is not needed. An ATM sensor/detector could use radiation reflectance (or some other detectable color property) to automatically detect a color change or a specific color in the wheel's outer picking surface. The colormetric sensor can be connected to suitable circuitry operative to detect a color related condition. The circuitry can cause at least one signal to be output in order to signify the detected change in color (or the attainment of a particular color). Similarly, a pattern recognition detector can be used to detect a specific pattern or a change of pattern in a picking surface. Thus, an ATM can have an automated wear detection arrangement An exemplary picker wheel's outer surface component may be formed using a multi step molding process. The first (innermost) surface portion can be molded using material of one color, and the next outwardly adjacent surface portion another color. Each consecutive layer of the surface material can be a different color. Alternatively, the material may include particles of different color in each layer.

In an exemplary example, the top (outermost) surface layer may be black in color. As the top layer wears away it exposes a different color underneath, such as a gray color. As the surface continues to wear, the second (gray) layer gives way to next expose the third layer (yellow) color. The wheel surface can repeatedly continue to wear down until a final layer (and color) is achieved.

Replacement of the picking surface can be mandated when any outer surface area visibly shows the final color. Of course other replacement timing arrangements may be exercised. For example, replacement may be dictated only after the surface optically unveils a continuous outer ring of the final color.

A picking surface structure can be alternatively formed. For example, during a picker wheel picking surface (e.g., rubber band) manufacturing process, pigment and/or colored particles may be gradually imparted to the material (rubber) in a manner that will result in an increase (or decrease) of a given color appearing with wear. For example, an arcuate segment of a rubber band may have an initial outer surface layer having no red color, an underlying second surface layer with some red color, and a further underlying third surface layer with mostly red color. Detection of a relatively high concentration of red would indicate the need for picker wheel servicing.

Also, instead of using different colors in different patterns, the same color may be utilized in each pattern. Upon attainment of the final pattern, the picking surface (or picker wheel) is ripe for service repair or replacement. Color shading may also be utilized in some embodiments.

The exemplary wear color arrangements can alleviate ATM servicing problems. For example, an ATM fault may occur that is related to currency note dispensing. The root cause of the fault may be unknown to the service person. Therefore, the service person may first replace the picker wheel, even though it is not the problem. Thus, the problem still remains and the picker wheel was needlessly replaced.

However, a picker wheel employing the novel color-indicating wear condition allows the service person to know in real time the true amount of its wear. Thus, instead of needlessly replacing the picker wheel, the service person can quickly proceed to the next step in fixing the problem source. Thus, an ATM component visibly showing a color coding that is reflective of its current wear state results in saved part replacement cost and saved service time.

In some exemplary embodiments particles having an indicating color or otherwise may have properties that compensate for the effects of wear. For example, particles included in layers of material that becomes exposed may have greater resilience or other properties that compensate for the material worn away. Of course this approach is exemplary.

As can be appreciated, many other ATM components (stripper wheels, belts, etc.) besides picker wheels can utilize the color-based wear-detection or compensation features described herein. The color-based wear-detection features provide an ATM service person the added ability to quickly visually (or optically) distinguish the current level or stage of component wear.

As can be recognized from the discussion of exemplary embodiments, the novel color-based wear indicators may allow for elimination of much waste in the part replacement industry. The wear indicators enable an ATM service technician to truly know the real-time state of a part's life. The wear indicators can act like replacement labels, messages, or warnings. A revealed visual pattern may be a message or warning that part replacement is now needed. An ATM equipped with a component wear indicator can also result in improved ATM efficiency and safety.

The wear indicators also make it easier for a new (inexperienced) ATM service person to learn to how to identify worn out parts. An unskilled service person can now more easily recognize a worn out part.

It should be understood that many of the ATM components that can benefit from use of wear-indicating color may individually be relatively inexpensive. Hence, having wear-indicating color in these inexpensive components will be an additional cost that needs to be considered.

Figure 22:
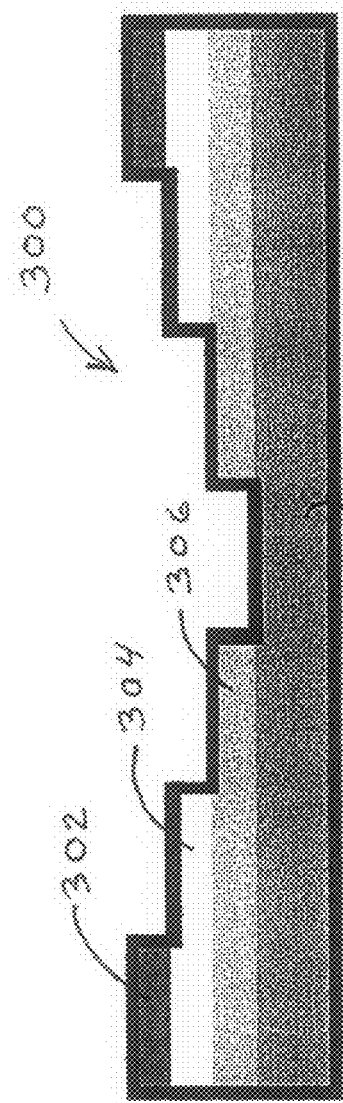
FIG. 22 shows a view of a color-based wear indicating layered arrangement.

FIG. 22 shows a side cut away cross-sectional view of a color-based wear indicator component segment 300. The segment 300 comprises a plurality of overlying or overlapping color-based wear levels 302, 304, 306, 308. Each layer 302, 304, 306 overlies at least one underlying inner layer 304, 306, 308 in at least two dimensions. The layers can be integrally formed together to comprise a unitary segment. The wear indicator is integral with or built into the component. Thus, the wear indicator itself can be a functioning section of the component which the indicator is actively monitoring. The wear indicator (e.g., a surface depth of a component) may even be monitoring itself, which constitutes a self-monitoring wear indicator.

The level 302 is the original outermost surface. It has the maximum thickness quality. The outermost surface 302 is of a first color, such as blue. The color can be sensed by humans and/or a sensor device. A pattern of plural colors may also be used as an alternative to a single color. For example, a color pattern may comprise three of more different colors. A pattern of two colors may comprise a checker board pattern or an alternating parallel stripes pattern.

More than one color can be used in a single layer to show the extent (e.g., length/area) of component wear. This may be beneficial during research or testing involving component factors of total wear versus an operating time.

The next sequentially adjacent inward (downward) level 304 comprises the first surface that will reveal a wear-indicating color for the component. This wear surface 304 is of a second color, such as yellow. The wear level 304 is an underlying layer located immediately adjacent to and in contact with the wear level 302.

The next sequentially underlying level 306 reveals a color corresponding to the next (further) level of component wear. This wear surface 306 is of a third color, such as orange.

The next sequentially underlying level 308 reveals the color of the last (innermost or deepest) level of wear. This last wear surface 308 is of a fourth color, such as red. Any showing of red during visual review can be a sign to the service person that replacement of the worn out component is now required.

It should be understood that in some embodiments during component inspection all of the colors (e.g., blue, yellow, orange, red) may be visible to an ATM service person or a machine color sensor. However, in an exemplary embodiment it is the currently deepest (innermost penetrated) revealed color which is used to indicate the present wear level or condition of the component. Colors can be arranged in levels from least critical to most critical in terms of correlation to a component's wear state. It is the newest exposed color level (i.e., the current most critical color level) which is used to determine the current wear condition.

Figure 23:
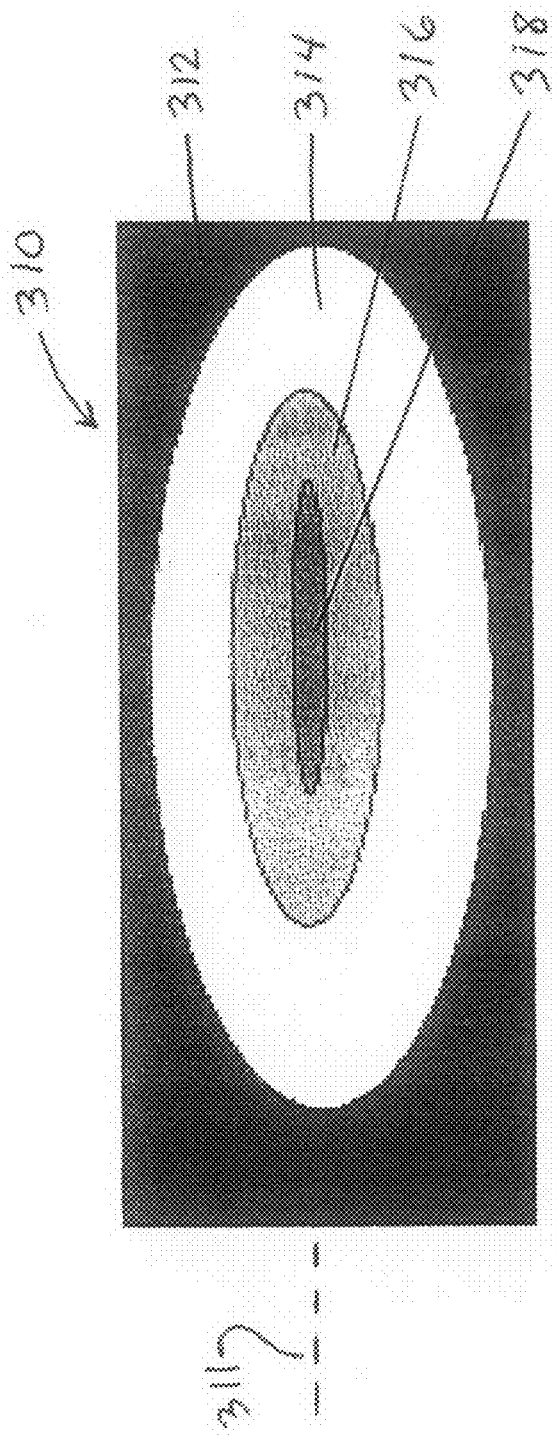
FIG. 23 shows a view of another color-based wear indicating layered arrangement.

FIG. 23 shows a portion of a cylindrical part 310 that comprises wear indicator colors 312, 314, 316, 318. FIG. 23 is a center slice view at and along (parallel to) the cylindrical axis 311. Four different levels of wear layers are respectively designated by the four different colors. The inner levels each have an egg-shaped volume about the axis, whereas the outermost level volume has a substantially straight outer circumferential surface in a direction parallel to the axis. Each overlying outer layer 312, 314, 316 completely surrounds at least one underlying inner layer 314, 316, 318 in three dimensions. The layers can be integrally formed together to comprise a unitary portion of a component.

In other color level arrangements, a color (such as orange) may be used to denote that component replacement is due. Another underlying color level (such as red) can be an additional safety level, especially in situations where component breakage would result in an unsafe condition for a customer, service person, and/or ATM machine. Thus, the last color (red) that can be exposed may be used to denote the existence of a safety danger. That is, a warning color level may exist below the component's replacement color level.

In another exemplary embodiment, an ATM machine can operate in regard to its component wear state to take corrective action. For example, a machine sensor can detect the occurrence of a safety color (e.g., the color red) exposed on an ATM component. A computer can be in operative connection with the particular color sensor. The computer may be part of the ATM or independent therefrom. The computer is notified when the sensor detects the appearance of the safety color (red). The computer can then produce a signal that causes the ATM (or the machine section involving the component) to be automatically shut down. Warning (visual and/or audible) alarms may also be tripped by the computer action. Thus, as a result of the ATM's ability to sense a specific color on a specific component, corrective action can be taken to automatically prevent a dangerous situation (to the machine or people) due to a defective or faulty component. Further the features described in U.S. Pat. No. 7,406,630, the disclosure of which is incorporated herein in its entirety, may be used in connection with some embodiments.

As can be seen, different colors, color levels, and color area shapes/sizes are applicable to different types of ATM components subject to wear. The wear can be the result of fatigue, erosion, corrosion, abrasion, etc. A new wear condition can be the consequence of change (e.g., reduction or deterioration) in the physical structure of a monitored component. The wear indicators discussed herein can be used in components that are subject to wear, including inner surfaces.

It should be understood that the exemplary wear indicator arrangements shown in FIG. 22 and FIG. 23 can be used with ATM components, parts, pieces, or segments. For example, a wear indicator arrangement from FIG. 22 or FIG. 23 may be used with an ATM picker wheel surface, stripper wheel surface, transport belt surface, fascia surface, housing surface, roller surface, rod surface, bearings, support leg surface, etc.

Wear-indicating colors may also be used to indicate component tampering, such as with an ATM currency cassette. A fraudulent mechanical tampering of a surface of the currency cassette (e.g., prying against a cassette door) would result in a color change in the area of tampering. For example, a scratch in a predetermined area that might be subject to attack on the cassette may typically be non visible. However, because of the built-in integral security feature, the tamper-causing mark (scratch) would result in a human-perceivable visible showing of a tamper-indicating color. Of course this approach is exemplary.

Figure 24:
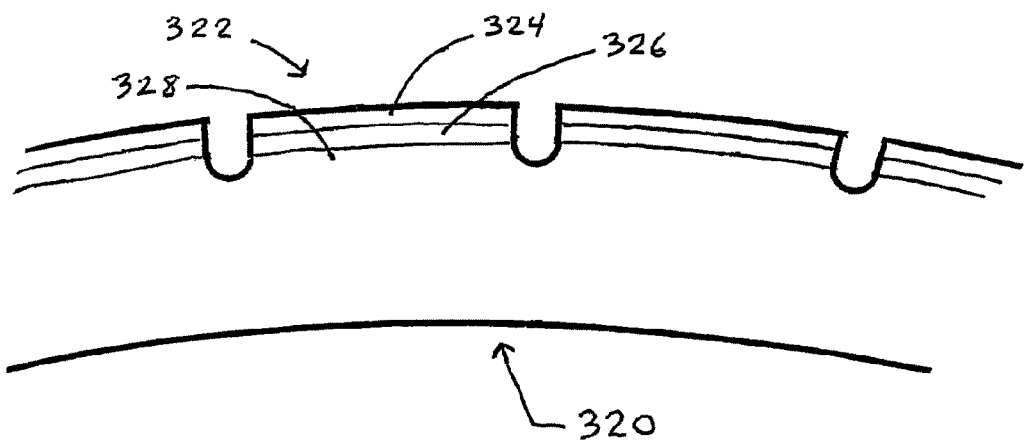
FIG. 24 shows a view of a picking member segment having wear-indicating layers of different colors.

FIG. 24 shows a cross-section side view of an exemplary surface segment 322 of a currency note picker member 320 for an ATM. The surface segment 322 can be part of a circumferential, ribbed picking tread. Two differently colored wear-indicating levels 324, 326 are shown in the tread. That is, the picker member 320 comprises a picking surface of stacked wear indicating color layers. The color level 324 is located radially outward of (above) the color level 326. The material including the color 326 will be observably exposed when the material including the color 324 has been breached, such as by tread wear. A third color level 328 can be the original (non modified) color of the tread material. The previously discussed (FIGS. 18-21) driving area 262 (and the leading area 256) of the resilient band 226 may comprise the picking surface 322. Either color 326 or 328 can be used to signal that tread (or band or picker member) replacement is needed. As previously discussed, additional deliberately colored levels (greater than two) can be used in an ATM picker member segment.

Figure 25:
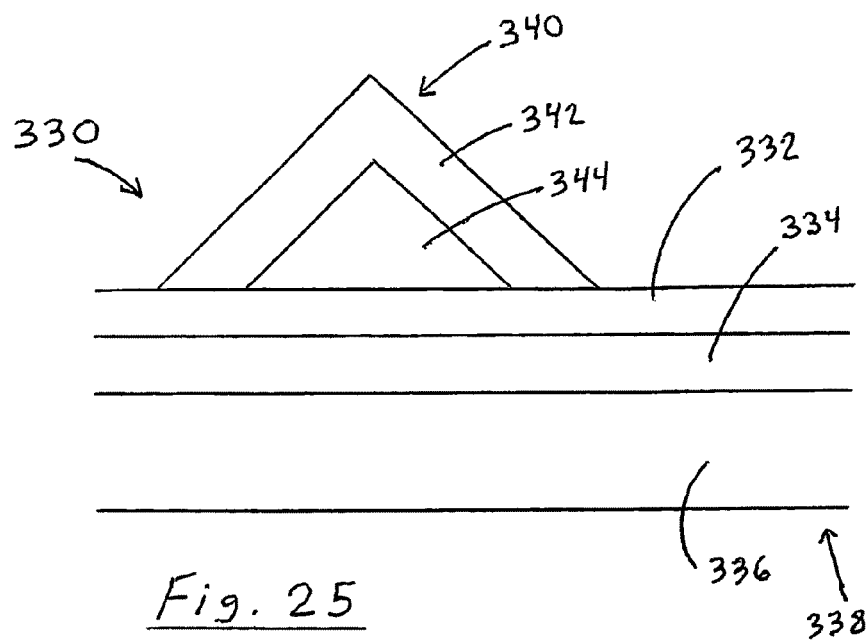
FIG. 25 shows a view of a machine belt having wear-indicating color layers.

FIG. 25 shows a cross-section side view of an exemplary belt segment 330 of a currency note transporter for an ATM. The previously discussed (FIG. 11) belt 174 (having projections 194) of the note transport 54 may comprise the belt segment 330. Three differently colored wear-indicating levels 332, 334, 336 are shown in a flat engaging portion 338 of the segment 330. Level 332 vertically overlies level 334, which in turn vertically overlies level 336. Two differently colored wear-indicating levels 342, 344 are shown in a projection portion 340 of the segment 330. Again, greater or fewer colors and/or patterns (designs, messages, marks, signs, etc.) can be used.

It should be understood that other wear indication color arrangements and other component applications may be used in various embodiments. The number of different color levels can also vary according to the particular ATM component being monitored for wear. For example, a component's outer wear surface may have only two color layers, three layers, four layers, five layers, or even more than five colored layers. The maximum thickness of the outer surface can also be a factor in the number of indicating layers employed.

In other exemplary embodiments, a wear signal emitter can be located in an ATM component subject to wear. The emitter may be in the component's outer surface area or below the surface area.

In a first arrangement, the emitter is located in the component such that it is unable to send a signal through a surface that has an acceptable (not worn out) outer surface thickness. The sufficient thickness can function as a signal shield or blocker. However, after the surface wears down (the shield weakens) the signal can penetrate therethrough. Examples of a wear signal emitter may include a radio frequency identification (RFID) tag and a radiation emitting device.

An RFID tag emitter positioned in an ATM component material can be operated either actively or passively. An active RFID emitter can have a life expectancy greater than the life of the ATM component (or its wear surface). Once a piece of the outer surface (or a designated surface region) reaches a particular thinness, then a wear signal from the active emitter can pass or escape through the remaining surface to be received by an outside signal receiver (e.g., machine sensor in operative connection with a computer). A passive RFID emitter can likewise provide a wear signal through a weak shield after receiving power from an outside source. Following reception or detection of a wear signal, an alarm or other action can be invoked to initiate corrective action regarding the worn ATM component. These exemplary arrangements allow for determination of a worn out ATM component based on reception of a signal issued from the component.

In another exemplary emitter/receiver arrangement, the level of wear in an ATM component can be determined based on a received signal strength. The stronger the signal received then the greater the level of wear (e.g., thinner component surface). The emitter (e.g., RFID) can periodically or continuously emit some type of detectable signal having an emitted signal strength. A sensor and/or computer is able to receive a portion or all of the emitted signal. As the component wears, more of the signal is able to pass through the component surface and a stronger signal is received. The computer can determine the strength of a received signal. Based on the known original (emitted) signal strength, the computer can determine whether the strength of the received signal correlates to a worn out component. Receiving a stronger signal may include receiving more of the total information that was originally sent in the emitted signal.

Also, an emitted signal may include data that identifies its component. Thus, a single receiver may be used with several different components.

Suitable circuitry including a computer or processor can analyze data received in a signal to determine the component that emitted that signal. Once a predetermined signal strength has been reached (or a certain quantity/quality of information received), then the identified component is deemed worn out.

The computer can operate in accordance with its programming to cause notification to a local service person via a service message left in accessible ATM memory of the component's fatigued situation. A replacement requirement indication may also be left in a service log or a database. The indication may also be accessed by running a diagnostic program. Alternatively, the computer in the ATM can remotely notify a service center via a network (e.g., the Internet) of the component's wear condition. In appropriated, component replacement can quickly follow the notification in order to prevent the ATM from needing to shut down.

In a further exemplary ATM emitter/receiver arrangement, the timing of an emitted signal may be controlled. For example, it may not be desirable (or practical) to check all ATM component signals at the same time. Analysis of components may be sequentially performed. It may also be undesirable to have a wear signal transmitted inside an ATM while the ATM is conducting a transaction. For example, an emitted signal may cause interference with ATM transaction devices that are operated during the transaction. Wireless communication interference may occur. Thus, in another exemplary embodiment the emitter is only operated responsive to instructions in at least one computer of the ATM when the ATM is not conducting a transaction.

The timing of a signal emitter (e.g., RFID tag output) can be controlled responsive to operation of an ATM computer. That is, the computer can control operation of the emitter. As a result, in an exemplary arrangement an ATM computer may periodically gather data via one or more component RFID tags while the ATM is not carrying out a financial transaction (e.g., a cash withdrawal, a deposit, a check cashing, a reallocation of funds between accounts, etc.).

In an alternative embodiment, polymers are used to indicate color change. By using changeable polymer structures in an ATM component surface, color can be changed based on surface wear. For example, a new surface may have an original (fresh) color of gold. As the component wears, the polymer structure automatically changes to disclose different colors. The final color can be an indication that the useful life of the component surface has expired.

In another arrangement, polymers in an ATM component can be activated upon initial use (e.g., friction caused heating of the component surface). The original component surface color may change to its final replacement-indicating color a predetermined time after the initial heating. Thus, an ATM component can include time-sensitive color-generating polymer structures.

Thus the exemplary automated banking machine features described herein achieve at least one of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the details shown and described.

In the following claims any feature described as a means for performing a function shall be construed as encompassing any means known to those skilled in the art to be capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

I claim:
1. Apparatus including:
an automated banking machine operative to carry out financial transactions responsive at least in part to data read from data bearing records,
wherein the machine includes a sheet moving component,
wherein the component comprises an outer surface segment,
wherein the outer surface segment includes at least one wear signal emitter therein,
wherein the at least one wear signal emitter includes a passive radio frequency emitter,
wherein the passive radio frequency emitter is operative to wirelessly emit at least one radio frequency signal indicative of a structural wear condition of the component,
wherein the machine includes at least one sensor,
wherein the at least one sensor is spaced from the component,
wherein the at least one sensor includes a radio frequency receiver,
wherein the radio frequency receiver is operative to wirelessly receive at least one radio frequency signal wirelessly emitted by the passive radio frequency emitter,
wherein the machine includes at least one computer,
wherein the at least one computer is operative to control when the passive radio frequency emitter operates to wirelessly emit at least one radio frequency signal,
wherein the at least one computer is programmed to prevent operation of the passive radio frequency emitter while the automated banking machine is carrying out a financial transaction,
wherein the at least one computer is in operative connection with the at least one sensor,
wherein the at least one computer is operative to receive at least one worn signal caused, responsive at least in part to the radio frequency receiver wirelessly receiving at least one radio frequency signal wirelessly emitted by the passive radio frequency emitter, by the at least one sensor, wherein the at least one computer is operative to determine whether the automated banking machine is not carrying out a financial transaction, wherein the at least one computer is operative while the automated banking machine is not carrying out a financial transaction, to cause the passive radio frequency emitter to wirelessly emit at least one radio frequency signal, wherein the at least one computer is operative to determine an unacceptable wear condition of the outer surface segment responsive at least in part to receiving the at least one worn signal, wherein the at least one computer is programmed to determine the unacceptable wear condition only while the automated banking machine is not carrying out a financial transaction, wherein the at least one computer is operative to cause a replacement-needed service notification responsive at least in part to a determination of the unacceptable wear condition.

2. The apparatus according to claim 1 wherein the automated banking machine includes a currency sheet dispenser, wherein the component comprises a currency sheet picker roller.

3. The apparatus according to claim 1 wherein the automated banking machine includes a currency sheet dispenser, wherein the component comprises a currency sheet transport belt.

4. A method comprising:
(a) operating a sheet moving component of an automated banking machine operative to carry out financial transactions responsive at least in part to data read from data bearing records, so as to cause wear to an outer surface segment of the component,
wherein the outer surface segment includes at least one wear signal emitter therein,
wherein the at least one wear signal emitter includes a passive, radio frequency emitter,
wherein the passive radio frequency emitter is operative to wirelessly emit at least one radio frequency signal indicative of a structural wear condition of the component,
wherein the machine includes at least one sensor,
wherein the at least one sensor is spaced from the component,
wherein the at least one sensor includes a radio frequency receiver,
wherein the radio frequency receiver is operative to wirelessly receive at least one radio frequency signal wirelessly emitted by the passive radio frequency emitter,
wherein the machine includes at least one computer,
wherein the at least one computer is operative to control when the passive radio frequency emitter operates to wirelessly emit at least one radio frequency signal,
wherein the at least one computer is programmed to prevent operation of the passive radio frequency emitter while the automated banking machine is carrying out a financial transaction,
wherein the at least one computer is in operative connection with the at least one sensor,
wherein the at least one computer is operative to receive at least one worn signal caused, responsive at least in part to the radio frequency receiver wirelessly receiving at least one radio frequency signal wirelessly emitted by the passive radio frequency emitter, by the at least one sensor, wherein the at least one computer is operative to determine whether the automated banking machine is not carrying out a financial transaction, wherein the at least one computer is operative while the automated banking machine is not carrying out a financial transaction, to cause the passive radio frequency emitter to wirelessly emit at least one radio frequency signal, wherein the at least one computer is operative to determine an unacceptable wear condition of the outer surface segment responsive at least in part to receiving the at least one worn signal, wherein the at least one computer is programmed to determine the current wear condition of the outer surface segment only while the automated banking machine is not carrying out a financial transaction, wherein the at least one computer is operative to cause a replacement-needed service notification responsive at least in part to a determination of the unacceptable wear condition;

(b) operating the at least one computer to determine that the automated banking machine is not carrying out a financial transaction;

(c) subsequent to (b), operating the at least one computer while the automated banking machine is not carrying out a financial transaction,
to cause the passive radio frequency emitter to wirelessly emit at least one radio frequency signal;

(d) subsequent to (c), operating the at least one computer to receive the at least one worn signal caused by the at least one sensor;

(e) operating the at least one computer to determine an unacceptable wear condition of the outer surface segment responsive at least in part to receiving the at least one worn signal in (d); and (f) responsive at least in part to (e), operating the at least one computer to cause a replacement-needed service notification.

5. The method according to claim 4 wherein the automated banking machine includes a currency sheet dispenser, wherein the component comprises a currency sheet picker roller, and wherein step (a) includes at least one currency sheet picking operation.

6. The method according to claim 4 wherein the automated banking machine includes a currency sheet dispenser, wherein the component comprises a currency sheet transport belt, and wherein step (a) includes at least one currency sheet transport operation.

7. A method of making an automated banking machine component, comprising:
(a) positioning at least one wear signal emitter during manufacturing of an automated banking machine currency note moving component,
wherein the at least one wear signal emitter includes a passive radio frequency emitter; and
(b) during a molding process in the manufacturing, forming the component,
wherein the formed component includes an outer surface segment,
wherein the segment includes the passive radio frequency emitter therein,
wherein the passive radio frequency emitter is operative to wirelessly emit at least one radio frequency signal indicative of a structural wear condition of the component, wherein the at least one radio frequency signal has a signal strength related to an unacceptable worn condition of the component, wherein the segment comprises an initial thickness, wherein after the initial thickness has worn a predetermined worn distance, the signal strength enables the at least one radio frequency signal to wirelessly pass through the segment, permitting the at least one radio frequency signal to be wirelessly received by a sensor spaced from the component, wherein the predetermined worn distance corresponds to the unacceptable worn condition of the component, wherein before the initial thickness has worn the predetermined worn distance, the signal strength prevents the at least one radio frequency signal from passing through the segment.

8. The method according to claim 7 wherein the automated banking machine component comprises a currency sheet picker roller, wherein (b) includes forming a currency sheet picker roller having a passive radio frequency emitter positioned therein.

9. The method according to claim 7 wherein the automated banking machine component comprises a currency sheet transport belt, wherein (b) includes forming a currency sheet transport belt having a passive radio frequency emitter positioned therein.

10. The apparatus according to claim 9 wherein the passive radio frequency emitter comprises an RFID tag, wherein (b) includes forming a currency sheet transport belt having an RFID tag therein.

11. The apparatus according to claim 8 wherein the passive radio frequency emitter comprises an RFID tag, wherein (b) includes forming a currency sheet picker roller having an RFID tag therein.

12. The apparatus according to claim 7 wherein the passive radio frequency emitter comprises an RFID tag, wherein (b) includes forming a component having an RFID tag therein.

13. The apparatus according to claim 2 wherein the passive radio frequency emitter comprises an RFID tag.

14. The apparatus according to claim 3 wherein the passive radio frequency emitter comprises an RFID tag.

15. The apparatus according to claim 1 wherein the passive radio frequency emitter comprises an RFID tag.

16. The apparatus according to claim 5 wherein the passive radio frequency emitter comprises an RFID tag, and wherein step (c) includes causing the RFID tag to emit at least one radio frequency signal.

17. The apparatus according to claim 6 wherein the passive radio frequency emitter comprises an RFID tag, and wherein step (c) includes causing the RFID tag to emit at least one radio frequency signal.

18. The apparatus according to claim 4 wherein the passive radio frequency emitter comprises an RFID tag, and wherein step (c) includes causing the RFID tag to emit at least one radio frequency signal.

19. The apparatus according to claim 4 wherein the automated banking machine includes machine memory which is accessible by a local service person, wherein (f) includes operating the at least one computer to cause the notification to be stored in the machine memory.

20. The apparatus according to claim 4 wherein (f) includes operating the at least one computer to cause the notification to be sent to a service center that is remotely located from the automated banking machine.

* * * * *